United States Patent
Nair

(10) Patent No.: US 11,567,680 B2
(45) Date of Patent: Jan. 31, 2023

(54) METHOD AND SYSTEM FOR DYNAMIC STORAGE SCALING

(71) Applicant: Dynavisor, Inc., Milpitas, CA (US)

(72) Inventor: Sreekumar Nair, San Jose, CA (US)

(73) Assignee: Dynavisor, Inc., Milpitas, CA (US)

(*) Notice: Subject to any disclaimer, the term of this patent is extended or adjusted under 35 U.S.C. 154(b) by 13 days.

(21) Appl. No.: 17/377,058

(22) Filed: Jul. 15, 2021

(65) Prior Publication Data
US 2022/0019364 A1    Jan. 20, 2022

Related U.S. Application Data

(60) Provisional application No. 63/052,404, filed on Jul. 15, 2020.

(51) Int. Cl.
*G06F 3/00* (2006.01)
*G06F 3/06* (2006.01)
*G06F 11/20* (2006.01)

(52) U.S. Cl.
CPC ............ *G06F 3/0632* (2013.01); *G06F 3/064* (2013.01); *G06F 3/0607* (2013.01); *G06F 3/067* (2013.01); *G06F 3/0647* (2013.01); *G06F 11/2094* (2013.01)

(58) Field of Classification Search
None
See application file for complete search history.

(56) References Cited

U.S. PATENT DOCUMENTS

2017/0075577 A1* 3/2017 Goldberg .............. G06F 15/167

* cited by examiner

*Primary Examiner* — Midys Rojas
(74) *Attorney, Agent, or Firm* — Goodwin Procter LLP

(57) ABSTRACT

A method and system for dynamic storage scaling based on automatically parallelizing access of names and data across multiple nodes or micro object stores (MOSs) is provided. A dynamic storage scaling device cluster is provisioned for a particular level of parallelism (e.g., N MOSs) when the cluster is created. The N MOSs may initially reside in a few physical servers (e.g., one server). When the data distribution causes peak resource usage of the physical servers, new server(s) can be added. Some micro object stores (MOSs) are moved to the new physical server(s) through a meiosis process. The storage devices associated with the moved MOSs are unmounted from the original servers and mounted to the new server(s). The meiosis continues until the cluster grows to full capacity. The scaling is dynamic and efficient since no data copy is involved in the meiosis and the initial resource cost is optimized.

20 Claims, 18 Drawing Sheets

Dynamic Scaling

Build a 1280 node cluster with zero copy scaling

| Stage | Redo | Clients | Servers | Parallelism (Ways) | Name Servers | Data Servers | Throughput (GB/s) |
|---|---|---|---|---|---|---|---|
| 0 | 1 | 40 | 40 | 1280 | 1280 | 1280 | X |
| 1 | 2 | 80 | 80 | 1280 | 1280 | 1280 | 2X |
| 2 | 4 | 160 | 160 | 1280 | 1280 | 1280 | 4X |
| 3 | 8 | 320 | 320 | 1280 | 1280 | 1280 | 8X |
| 4 | 16 | 640 | 640 | 1280 | 1280 | 1280 | 16X |
| 5 | 32 | 1280 | 1280 | 1280 | 1280 | 1280 | 32X |

Figure 1

Legend:
**MSBD={p,q,r,s}*N*M**
p = MOS Config (TB)
q = Metadata1 (TB)
r = Metadata2 (TB)
s = Data (TB)
N = Replication Factor
M = Number of MOS Imagine a 1 exabyte data lake...
- With an average file (object) size of 1 MB, Total number of files (objects) = 1 Trillion
- At 4 Billion names per server; Total servers = 256, Total Metadata size = 4 TB/server
- Hot Storage = 32 PB, Warm Storage (Cloud) = 128 PB, Cold Storage (Cloud) = 1 EB

| Milestone | Description | Hot | | Cloud |
|---|---|---|---|---|
| Stage 0 | Servers | 8 | | 8 |
| [Total Setup] | MSBD={1,0.1,0.1,4}x2x32 | | | |
| | Total HDD | 2.5 PB | | |
| | Total SSD | 100 TB | | |
| | Warm Storage (Cloud) | | | 2.5 PB |
| | Cold Storage (Cloud) | | | 64 TB |
| End of Stage 0 | Servers | 8 | | 8 |
| | MSBD={1,0.25,0.25,8}x2x16 | | | |
| | Total HDD | 2.5 PB | | 4 PB |
| | Total SSD | 100 TB | | 32 PB |
| [Before Meiosis 1] | Warm Storage (Cloud) | | | |
| | Cold Storage (Cloud) | | | |
| End of Stage 1 | Servers | 16 | | 16 |
| | MSBD={1,0.25,0.25,8}x2x16 | | | |
| | Total HDD | 4.5 PB | | 4.5 PB |
| | Total SSD | 256 TB | | 128 PB |
| [Before Meiosis 2] | Warm Storage (Cloud) | | | 8 PB |
| | Cold Storage (Cloud) | | | 64 PB |
| End of Stage 2 | Servers | 32 | | 32 |
| | MSBD={1,0.25,0.25,16}x2x8 | | | |
| | Total HDD | 8.5 PB | | 8.5 PB |
| | Total SSD | 256 TB | | 256 TB |
| [Before Meiosis 2] | Warm Storage (Cloud) | | | 16 PB |
| | Cold Storage (Cloud) | | | 128 PB |
| End of Stage 3 | Servers | 64 | | 64 |
| | MSBD={1,0.5,0.5,32}x2x4 | | | |
| | Total HDD | 16.5 PB | | 16.5 PB |
| | Total SSD | 0.5 PB | | 0.5 PB |
| [Before Meiosis 3] | Warm Storage (Cloud) | | | 32 PB |
| | Cold Storage (Cloud) | | | 256 PB |
| End of Stage 4 | Servers | 128 | | 128 |
| | MSBD={1,1,1,64}x2x2 | | | |
| | Total HDD | 32.5 PB | | 32.5 PB |
| | Total SSD | 1 PB | | 1 PB |
| [Before Meiosis 4] | Warm Storage (Cloud) | | | 64 PB |
| | Cold Storage (Cloud) | | | 512 PB |
| End of Stage 5 | Servers | 256 | | 256 |
| | MSBD={1,2,2,128}x2x1 | | | |
| | Total HDD | 64.5 PB | | 64.5 PB |
| | Total SSD | 2 PB | | 2 PB |
| | Warm Storage (Cloud) | | | 128 PB |
| | Cold Storage (Cloud) | | | 1 EB |

X GB/s — 8 Servers, 2.5 PB HDD, 100 TB SSD

32X GB/s — 256 Servers, 64.5 PB HDD, 2 PB SSD, 128 PB Warm Storage (Cloud), 1 EB Cold Storage (Cloud)

● START  Zero Copy Scaling  ● FINISH

Figure 16

METHOD AND SYSTEM FOR DYNAMIC STORAGE SCALING

CROSS-REFERENCE TO RELATED APPLICATIONS

The present application claims the benefit of and priority to U.S. Provisional Application No. 63/052,404 filed on Jul. 15, 2020, entitled "Method and System for Dynamic Storage Scaling," which is herein incorporated by reference in its entirety.

TECHNICAL FIELD

This disclosure relates to a method and system for dynamic storage scaling based on automatically parallelizing access of names and data across multiple micro object stores.

BACKGROUND

Cluster-based parallel storage technologies are used to manage millions of files, thousands of concurrent jobs, and thus are extremely important to deliver scalable performance across a range of scientific and industrial applications. However, there have been challenges in traditional parallel storage systems.

Traditionally, it is difficult to parallel name and data nodes when scaling the storage systems. Also, replicated storage may cause synchronization problems. For example, synchronization locks need to be maintained at a disk level such that a replicated copy of a data structure is locked on disk before the data structure can be safely accessed. In addition, with traditional parallel storage systems, the serialization of the and data operations may cause network and resource bottlenecks. In some existing storage systems, the load may be disproportionately balanced across the servers and network resources.

SUMMARY

To address the aforementioned shortcomings, a method and a system for dynamic storage scaling based on automatically parallelizing access of names and data across multiple nodes or multiple micro object stores are provided. A dynamic storage scaling system comprises a first set of micro object stores (MOSs) operating on data in a data domain, the data being stored in storage devices of a storage domain; one or more clients that request data reference operations via a first connectivity domain with the first set of MOSs; and a plurality of multi stream block devices (MSBDs) in two or more storage domains, wherein the storage domains are logically grouped into the MSBDs and each MOS in the first set is associated with a set of MSBDs of the plurality of MSBDs, wherein the storage domains are communicatively coupled to the data domain through a second connectivity domain.

The dynamic storage scaling system is configured to receive the data in a micro object from a client; assign the micro object to a MOS of the first set of MOSs residing on a first set of servers of a cluster; determine that a new server is needed based at least on resource usage of the first set of servers; add a second set of servers to the cluster, a number of servers in the second set being determined based on a replication factor; move a subset of the first set of MOSs from the first set of servers to the second set of servers such that each server in the first and second sets has an equal number of MOSs; unmount storage devices of the MSBDs associated with the subset of MOSs from the first set of servers; and remount the unmounted storage devices on the second set of servers.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the drawings is below.

FIG. 1 is a dynamic scaling structure in a data center deployment, according to some embodiments.

FIG. 16 illustrates performance of DSSD dynamic scaling, according to some embodiments.

DETAILED DESCRIPTION

Figure 2:
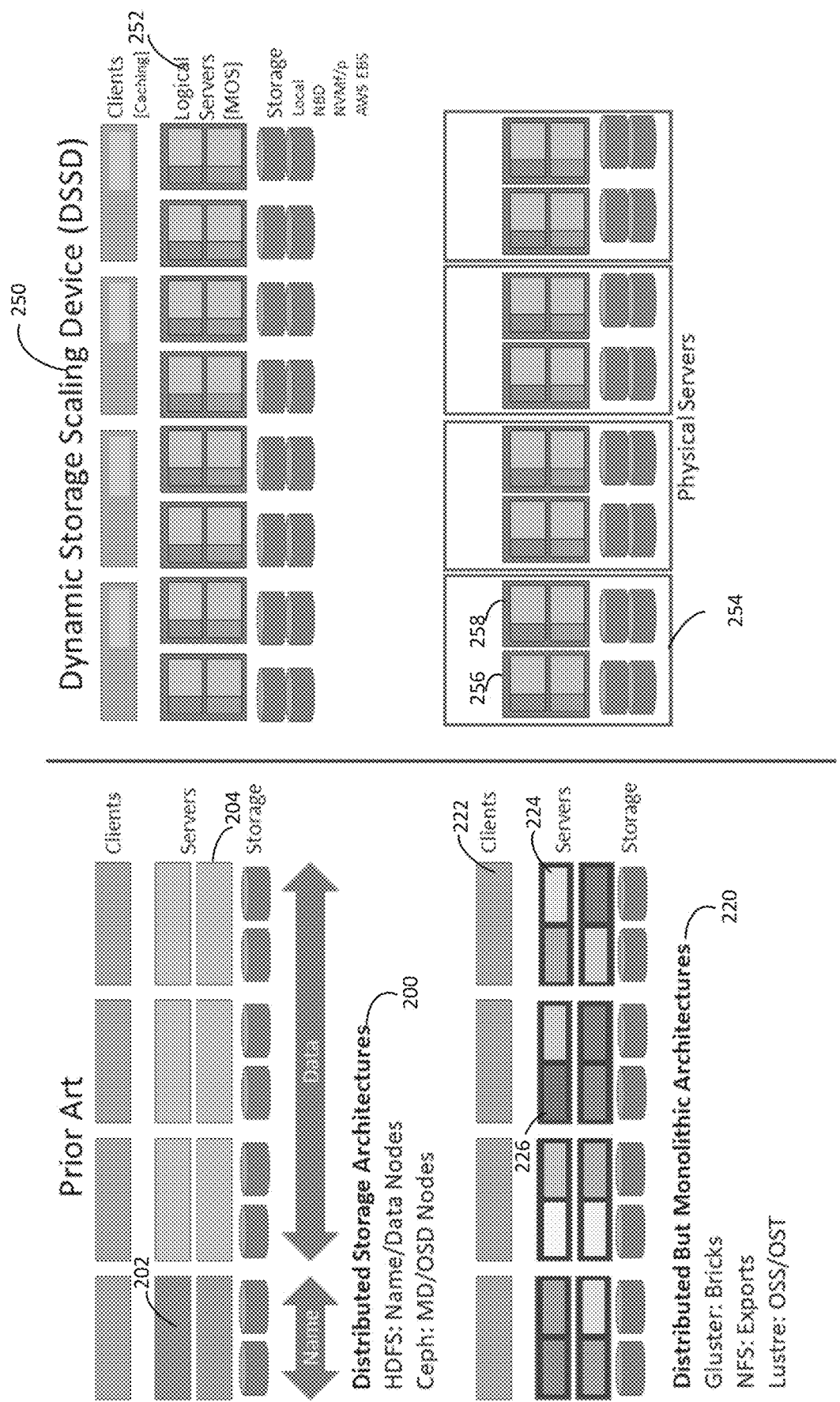
FIG. 2 is a comparison between a dynamic storage scaling device (DSSD) system and prior storage scaling systems, according to some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The present disclosure describes a high-performance superscalar storage architecture including one or more dynamic storage scaling devices (DSSDs). A DSSD utilizes micro object stores (MOS) in a data domain to communicate with storage domains to implement the dynamic scaling with zero data copying. A DSSD may be a device that can be implemented in hardware, software, or in a hybrid of hardware and software. Each of these implementations will respectively be described below at least in FIGS. 4, 5, and 7. While some parts of the disclosure below assume a software implementation, it should be understood that the description herein can be mapped to hardware and hybrid implementations easily and efficiently to achieve same or similar functionalities.

Massively Parallelizing Name and Data Nodes

Advantageously, the scalar storage architecture DSSD described herein allows name and data nodes to be massively paralleled. A name node is a master node/server that manages a file system namespace and regulates access to files by clients. The name node stores only metadata of actual data or a dataset while a data node stores the actual data. Traditionally, parallelizing name nodes has been a challenge in the architecture of scalable/distributed storage solutions. File sizes in a file system and object sizes in an object store can be arbitrarily large. The DSSD described herein can fragment a large file or object into multiple finite-sized units (e.g., 1 megabyte for each unit). A finite-sized unit is referred to as a micro object. The DSSD can identify each micro object by a unique name and assign each micro object to one of N parallel or distributed name and data nodes, where N is a positive integer.

In some embodiments, name nodes combined with data nodes are referred to as micro object stores (MOS). A micro object store is a partial file system or a partial object store. A collection of micro object stores together can make a full file system or a full object store. Being distributed across numerous entities (e.g., hundreds or thousands of physical servers), each file system or object store can hold an enormous amount of data (e.g., in exabytes).

Although micro object stores can include N name nodes and M data nodes (N and M are different integers), it is assumed N=M in the present disclosure. It is both common and beneficial to configure N=M in practical applications. For example, when the number of name nodes and the number of data nodes are the same, the name and data lookup for a micro object can happen from the same micro object store and thus a single operation can often fetch the name and data of the micro object (despite that the name and data blocks for the micro object may reside in different micro object stores).

In some embodiments, the DSSD can provide a user-defined filter to implement a distribution function. The distribution function determines the placement of the name and data of each micro object in specific micro object stores. In some embodiments, the distribution function is a hash function that translates the name of a file/object and optionally the offset of a micro object in the original file/object to determine an index in one of N micro object stores in a cluster. Since the semantics and structure of the names of files/objects are recognizable, the distribution function can be designed to avoid anomalous collisions of micro objects into the same micro object store, thereby ensuring fair and even distribution of micro objects across micro object stores.

In file systems and object stores, attributes of files/objects need to be maintained. The attributes include, but are not limited to, sizes, permissions, unique identifiers (e.g., Linux i-node), time of creation, time of access, time of modification, etc. The DSSD described herein can synchronously update the attributes of files/objects during each storage operation without impacting the ability to parallelly distribute name and object fragments (micro objects) across micro object stores. Therefore, the system performance is also not impacted.

High Storage Scaling

Advantageously, the DSSD can provide high storage scaling by virtue of its ability to automatically parallelize the access of name and data (e.g., creation, lookup, update) across multiple nodes or micro object stores.

In some embodiments, a DSSD cluster is provisioned for a particular level of parallelism (e.g., N micro object stores) when the creation of the cluster starts. This pre-provisioned or statically provisioned scaling factor is critical to the DSSD scaling and performance because the names and data can be spread evenly across N micro object stores from the beginning of the data distribution, for example, as shown in FIG. 2.

In DSSD, it is not required that the N micro object stores reside in N physical servers to start the data distribution or storage. In some embodiments, all of the N micro object stores may initially reside in one physical server (e.g., a first server). When the data distribution causes peak resource usage (e.g., one or more of CPU, memory, and storage exceeding a predefined threshold) of the one physical server, a new physical server (e.g., a second server) will be added. A half of the N (N/2) micro object stores are then moved to the new physical server or second server through a process referred to as meiosis. The meiosis process may include multiple stages. Each meiosis stage involves zero data copies, and therefore achieves zero copy. In some embodiments, the storage devices are unmounted from the original server (e.g., the first server) and mounted to the new server (e.g., the second server), which will be detailed below (e.g., in FIGS. 8 and 9). For simplicity, in the illustration of this disclosure, the number of nodes (e.g., physical servers) is doubled and the number of MOSs per node is halved during each meiosis stage. However, it should be understood that the number of new nodes and the distribution of MOSs among the new nodes can be configured in any arbitrary manner in each meiosis stage, as long as a DSSD cluster map in a global DSSD cluster configuration maintains a precise location of each MOS (e.g., in which physical server the MOS resides).

After the second server was added in the first meiosis stage, in the next stage of meiosis, two new physical servers (e.g., a third server and a fourth server) are added. Each of the third server and fourth server will serve only N/4 micro object stores. A meiosis stage continues until the peak usage of the physical servers hits (e.g., above a predefined threshold of usage). The entire meiosis process ends when N micro object stores have been configured to run on N physical servers. Since the meiosis can start with very few server(s) (e.g., a single physical server) and storage resources, significant savings in the initial cost may be achieved. Also, meiosis may yield significantly large scaling in performance as the cluster grows, which will be described below in reference to FIGS. 4-16.

The zero copy scaling reduces the processing time in each meiosis stage. For example, with no data copying, meiosis in each stage may complete in hours rather than days if data have to be copied to level out or rebalance across the newly added servers and storage devices as in scaling of traditional storage solutions.

The zero copy scaling also facilitates the DSSD to build partitions or buckets that scale to exabytes in size such that large pools of data can reside in one place, as opposed to building numerous smaller partitions or buckets.

In practice, when designing a cluster of N nodes, it is typical to overprovision the cluster to 2N or 4N nodes so that the data distribution can start with 2N or 4N micro object stores. This allows a headroom to scale further than the initial estimates if a need arises. Although the description hereafter assumes that the cluster grows by a power of two, this is not a requirement for the DSSD. The cluster can grow in an arbitrary manner.

Relocatable Storage

Advantageously, the DSSD allows storage to be relocatable during meiosis.

Ideally, storage is accessible over network(s) such that each storage unit can be unmounted from a physical server and remounted onto another server without on-site operations. However, DSSD does not preclude the option of manually removing disks from one server and reinstalling the disks to another one, although this option can be cumbersome and error-prone.

In some embodiments, DSSD provides a multi stream block device (MSBD) for data distribution. An MSBD is a logical storage unit or block device in connection with a MOS. The MSBD facilitates different types of information to be channeled over an arbitrary number of different streams. For example, stream 0 may be MOS configurations, streams 1 and 2 may be metadata, and stream 3 may be data or micro objects. In some embodiments, the actual storage devices backing the streams may also be diverse. For example, stream 0 may be a single raw Hard Disk Drive (HDD), stream 1 may be a single raw flash disk, stream 2 may be a macro disk with flash disks, and stream 3 may be a macro disk with HDDs. A macro disk is a logical string of disks of the same type (e.g., flash or HDD) and of arbitrary sizes. A disk in a macro disk is divided into micro disks to help dynamic allocation and facilitate quarantining when a portion of a disk is found faulty. The micro disk is associated with some management services such as a micro disk map. The macro disk will be described in more detail with reference to FIG. 6.

In some embodiments, each micro object store includes a MOS controller. The MOS controller groups an arbitrary number of MSBDs together. Each MSBD represents one unit of replication of data. The MOS controller channels every storage operation such as reads and writes to each of the MSBDs associated with the MOS controller.

A storage domain is a pool of storage devices. For example, a storage domain can be a pool of Non-Volatile Memory express (NVMe) over fabric or Peripheral Component Interconnect (PCI) Express. An MSBD may be formed from disks of the same storage domain. However, no two MSBDs associated with a MOS controller can be from the same storage domain for fault tolerance because the failure of a single storage domain should at most bring down one MSBD associated with the MOS controller.

Memory Mapping

Advantageously, DSSD defines its own memory mapping at a micro object store level for synchronization as well as performance.

Replicated storage across MSBDs associated with micro object stores poses significant problems. For example, page caches may keep multiple copies of the same data blocks because the page caches were directed to multiple storage devices in the same node. Additionally, synchronization locks need to be maintained at a disk level, and each operation needs to ensure that each replicated copy of a data structure is locked on disk before the data structure can be safely accessed (e.g., read or written).

To solve these problems, DSSD enforces that all data are read into a memory cache associated with a micro object store (e.g., via a reference operation) before the data can be used. Similarly, DSSD is also configured to first write all data into the memory cache before writing the data to a disk (e.g., via a sync operation). A coherency domain managed by a micro object store is defined for these data operations as described below in reference to FIGS. 4-7. Since data can be locked in the memory cache and get secured, DSSD ensures efficient synchronization. Also, storage system performance is improved (e.g., the processing time is reduced) because data can be directly read from the memory cache.

In some embodiments, data in a memory cache may be synchronized to a disk according to different policies defined by DSSD. For example, by default, DSSD may enforce a write-through policy, that is, allowing all writes to a memory cache to also write to a disk in real-time. However, upon a user's request, DSSD can relax this policy to a write-back policy where data in the memory cache will be written in batches, e.g., at the end of a transaction, at a predefined interval, etc.

DSSD constructs memory mappings to easily handle both a large volume of data or a small volume of data. For example, MOS configurations in stream 0 of MSBD and/or metadata in stream 1 of MSBD (e.g., the hash table core and allocators) are small. DSSD may be configured to directly map such data in memory during the MOS initialization and have the data reside in memory throughout the lifetime of the DSSD system. However, since metadata in stream 2 of MSBD or data in stream 3 of MSBD may be prohibitively large to be kept in memory, DSSD may use a variant of demand paged memory allocation to map finite-sized chunks of information in memory, i.e., containers. DSSD may pack similar-sized data or data structures into a container to avoid fragmentation during data allocation and reclamation.

DSSD further configures the disabling of pagecaches maintained by the operating system to avoid the memory pollution discussed above. For example, under Linux, all storage devices in the MSBDs are opened with an "O_DIRECT" flag to indicate that reads and writes should directly operate on a disk without using the pagecaches.

Power Domain

Advantageously, DSSD segregates the placement of critical resources on separate power domains. Each storage domain is on its own a power domain. Each MOS is on its own a data domain and a coherency domain, while each of the data domain and the coherency domain can be a power domain. Alternatively, groups of MOSs may occupy a power domain. The components in a power domain fail together.

DSSD ensures there are sufficient redundant standbys for each of the power domains although not all redundant instances of each power domain are shown in the figures illustrated herein.

Diverse Connectivity

Advantageously, DSSD offers diverse types of connectivity across its components and clients. For example, as described below in FIGS. 4-9, 14, and 15, the DSSD system may include at least connectivity domain A, connectivity domain B, and connectivity domain C.

Connectivity domain A specifies the possible types of connectivity between DSSD and the clients. In a hybrid model, connectivity domain A may also be used to connect DSSD and servers. Examples of connectivity domain A may include:

1. Different types of network architectures including Ethernet, Infiniband, etc.
2. PCI Express. For example, DSSD may be implemented as a Multi-Root Input/Output Virtualization (MR-IOV) device.

Connectivity domain B specifies the possible types of connectivity between DSSD and the storage domains. Examples of connectivity domain B may include:

1. Ethernet or Infiniband as in a Network Block Device (NBD), Network-Attached Storage/Storage Area Network (NAS/SAN), etc.
2. Fiber channel.
3. Internet Small Computer Systems Interface (iSCSI).
4. PCI Express, Host Bus Adapter (HBA), or Fabric (100-400 Gigabit Ethernet or Infiniband) including Just a Bunch Of Disk (JBOD), Just a Bunch Of Flash (JBOF), NVMe over fabric, NVMe over PCI Express, etc.
5. Internet, e.g., cloud storage such as Amazon® Elastic Block Store (EBS).

Connectivity domain C specifies the connectivity between DSSD and the warm/cold storage. Connectivity domain C can be any of the connectivity types for connectivity domain B depending on the underlying architecture for the warm/cold storage.

Partition Size

Operating systems may impose restrictions on a maximum size of a partition or a maximum number of files or i-nodes per partition. Advantageously, DSSD provides a direct Application Programming Interface (API) for a file system that bypasses the operating system. As a result, DSSD can deal with trillions of micro objects and exabytes of data per partition/bucket. DSSD also provides a simple API for object stores.

Transactional Storage

Advantageously, DSSD facilitates transactional storage. Within the lifetime of a transaction, DSSD allows data to safely reside in memory and also allows all data to be atomically written to a disk when a transaction is committed. If a transaction aborts, e.g., due to a failure of a system or an application, the data in DSSD will be safely rolled back to the last known safe point.

Network Performance Monitoring and Disaster Recovery

Advantageously, DSSD transparently facilitates the features including at least (1) network performance monitoring and (2) backup and disaster recovery.

DSSD generates statistical data to monitor network performance. The statistical data provides details about storage and networking operations. In some embodiments, DSSD provides statistical data at a per-process level. The MOSs periodically, e.g., once per 15 minutes, persist the statistical data on a disk. The statistical data can be harvested online or offline for deep analytics to identify performance issues at a data center level. For example, the DSSD statistical data may indicate a persistent delay in data transmission between a client and a server, which may cause a network issue such as a faulty network switch or router to be identified and fixed.

For backup and disaster recovery, DSSD supports built-in backup operations. In some embodiments, DSSD internally maintains dirty lists of names and data of micro objects that were recently modified. This list facilitates fast retrieval and processing of dirty information that can be packed and sent to the backup servers. Also, DSSD enables high efficiency of disaster recovery services with very low recovery point objective (RPO) and recovery time objective (RTO) based on the fast backup and parallel data transfer abilities offered by DSSD. An RPO indicates the frequency at which data is backed up to a recovery site. An RTO indicates the time in which a recovery site can be brought up and running.

Heterogeneous Data Partition

Advantageously, the heterogeneous data tiering of DSSD allows data to be partitioned into hot, warm, and cold storages. This will be described in more detail below at least in FIGS. 3, 4, and 7.

In some embodiments, hot storage is managed inside the storage domains of DSSD itself, while warm and cold storages are typically targeted to storage solutions offered by cloud providers and also targeted to on-premise storage pools. The cloud can be a public cloud, or alternatively, a private or a hybrid cloud that can seamlessly be supported via API extensions.

Typically, DSSD designates warm data to reside in cloud storages such as Amazon® S3, Microsoft® Azure Blob, and/or Google® Cloud Storage, and also designates cold data to reside in cloud storages such as Amazon® Glacier, Microsoft® Azure Storage Archive, and/or Google® Cloud Storage Archive. However, DSSD may designate the warm data to on-premise storage pools such as NAS or SAN. In some scenarios, for example, if data needs to be re-fetched for computation, NAS or SAN may be used to provide cost-effective and acceptable performance. DSSD may also designate the cold data to on-premise magnetic tape drives. The magnetic tape drives allow the data to be archived for long-term preservation.

DSSD internalizes the APIs for role/access management, security management, and data access from multiple public clouds such as Amazon® Web Services (AWS), Microsoft® Azure, and Google® Cloud Platform. This enables application developers to develop cloud agnostic or cloud neutral programs such that the underlying data (e.g., hot, warm, or cold data) can be spread across multiple clouds.

Dynamic Scaling

FIG. 1 provides a high-level illustration of dynamic scaling in DSSD. Suppose a cluster with 1280 nodes is to be built. The 1280 nodes may include 32 racks with 40 servers on each rack. As shown in 102 of table 100, DSSD enables an initial cluster to be built with merely one rack. In five steps or meiosis stages as shown in 104, DSSD can scale the initial cluster to a cluster with full capacity. In other words, the number of servers/nodes is increased step-by-step from 40 to 80, 160, 320, 640 until the full 1280. This scaling procedure has at least four notable benefits as described below.

First, because initially a single rack is used, the initial cost is therefore only 1/32 of the cost of the full cluster with 32 racks. The cost will be increased only if the needs grow.

Second, during the installation, the cluster is statically provisioned to have 1280 ways of parallelism. The cluster starts functioning with 1280 name nodes and 1280 data nodes. In a common case, the name and data nodes are combined into 1280 MOSs. Alternatively, there can be 1280 MOSs for name nodes and 1280 MOSs for data nodes. In either way, from the beginning of the data distribution, file/object metadata and data blocks are uniformly distributed across the 1280 MOSs as specified by a distribution function. A user-defined distribution function will be described in FIG. 13. The metadata (e.g., Linux i-nodes discussed below in FIG. 11) for successive files in a directory or successive objects in a bucket will be allocated in different MOSs. Also, the successive data blocks of a file or object will be distributed in different MOSs. This automatic parallelization of storage traffic for name and data management linearly accelerates I/O operations both on the network as well as on the storage associated with the MOS. As shown in 106, the initial cluster with 40 nodes in a rack provides X GB/s of data throughput across all applications running on the cluster. When the cluster size is doubled to 80 nodes, the performance boosts to 2X GB/s in 108. As the cluster size keeps doubled at each step, a 32X GB/s throughput in 110 would eventually be reached when the cluster is fully built out.

Third, in the above common case where 1280 name nodes and 1280 data nodes are combined into 1280 MOSs, each of the initial nodes will have 32 MOSs, and each of the MOSs will be associated with a set of MSBDs. The storage associated with an MSBD is fully relocatable in that when the cluster grows, there is no data copying or data rebalancing involved, i.e., zero copy scaling. In some embodiments, the cluster grows through a meiosis process including multiple meiosis stages. In each meiosis stage, the cluster size is doubled, and a half number of the MOSs in each of the initial or original nodes will migrate to a corresponding new node. During the migration, the storage associated with the MSBDs will be unmounted from the original node and remounted onto the new node. Because of the zero copy scaling, the cluster growth using the meiosis reduces significantly in time, for example, taking a few hours as compared to days of cluster building using traditional approaches.

Fourth, as shown in 112 and 114 of FIG. 1, DSSD is able to combine the client and server portions of DSSD into the same node. That is, each node can be a client node and a server node at the same time. This feature (1) alleviates the need to have separate physical servers to run a DSSD server, and (2) maximizes the number of server nodes. In other words, there may be as many server nodes as possible, thereby increasing the levels of parallelism when data is accessed from a server.

FIG. 2 compares the present DSSD system against prior storage scaling systems. The prior systems shown in FIG. 2 include a Distributed Storage Architecture (DSA) 200 and a Distributed But Monolithic Storage Architecture (DBMSA) 220. The DSA 200 may be a Hadoop Distributed File System (HDFS), Ceph, etc. In DSA 200, there are a central name (metadata) server 202 and distributed data nodes 204. The architecture 200 can provide high levels of scaling, typically petabytes of storage. However, there is a potential bottleneck from the centralized name (metadata) server 202. The other prior system DBMSA 220 may be Gluster, NFS, Lustre, etc. In DBMSA 220, storage can be partitioned into sizes, typically hundreds of terabytes, which are managed by a single virtual server running on a physical server. When a single application is accessing a single partition, the corresponding client node 222, server node 224, and network path may be severely bottlenecked; however, the rest of the servers (e.g., 226) and the network may be idle. In other words, the load in DBMSA 220 is disproportionately balanced across the servers and network resources. Moreover, in both cases of DSA 200 and DBMSA 220, the serialization of the name and data operations may cause bottlenecks, where the operations include first looking up pathnames to find out where data resides and then accessing the actual data.

As compared to DSA 200 and DBMSA 220, DSSD 250 facilitates a distributed name and data node architecture. Although a name node and a data node can be in different MOSs, it is common that the name node and the data node are combined into a MOS, e.g., MOS 252 as depicted. MOS is a logical name/data server and a partial file system or partial object store. MOS is also the fundamental building block of DSSD and a key architectural component for dynamic scaling. MOS differentiates DSSD from other scaling systems. With MOS, a file or an object is broken into finite-sized chunks, i.e., micro objects. A micro object can be identified by a unique name and accessed in a single operation in most cases. The unique name can be a combination of the original file/object name and the offset of the micro object inside the file/object. The access includes read, write, and other operations. Micro objects from a single application are widely dispersed across MOSs residing on multiple physical servers, thereby improving parallelism for network and storage operations, improving throughput, and reducing latency.

In both DSA 200 and DBMSA 220, servers are tightly coupled to the storage devices managed by the servers, whereas in DSSD 250, each MOS is loosely coupled to the underlying relocatable storage devices via the MSBD. An MSBD always stays anchored to a MOS but allows the MOS to migrate from one physical node/server to another. Different MOSs may live in a physical server concurrently, for example, MOSs 256 and 258 reside in a physical server 254. During meiosis, the MOSs in a physical server (e.g., 254) will be divided and distributed to other physical servers together with the MSBDs and associated underlying storage.

Figure 3:
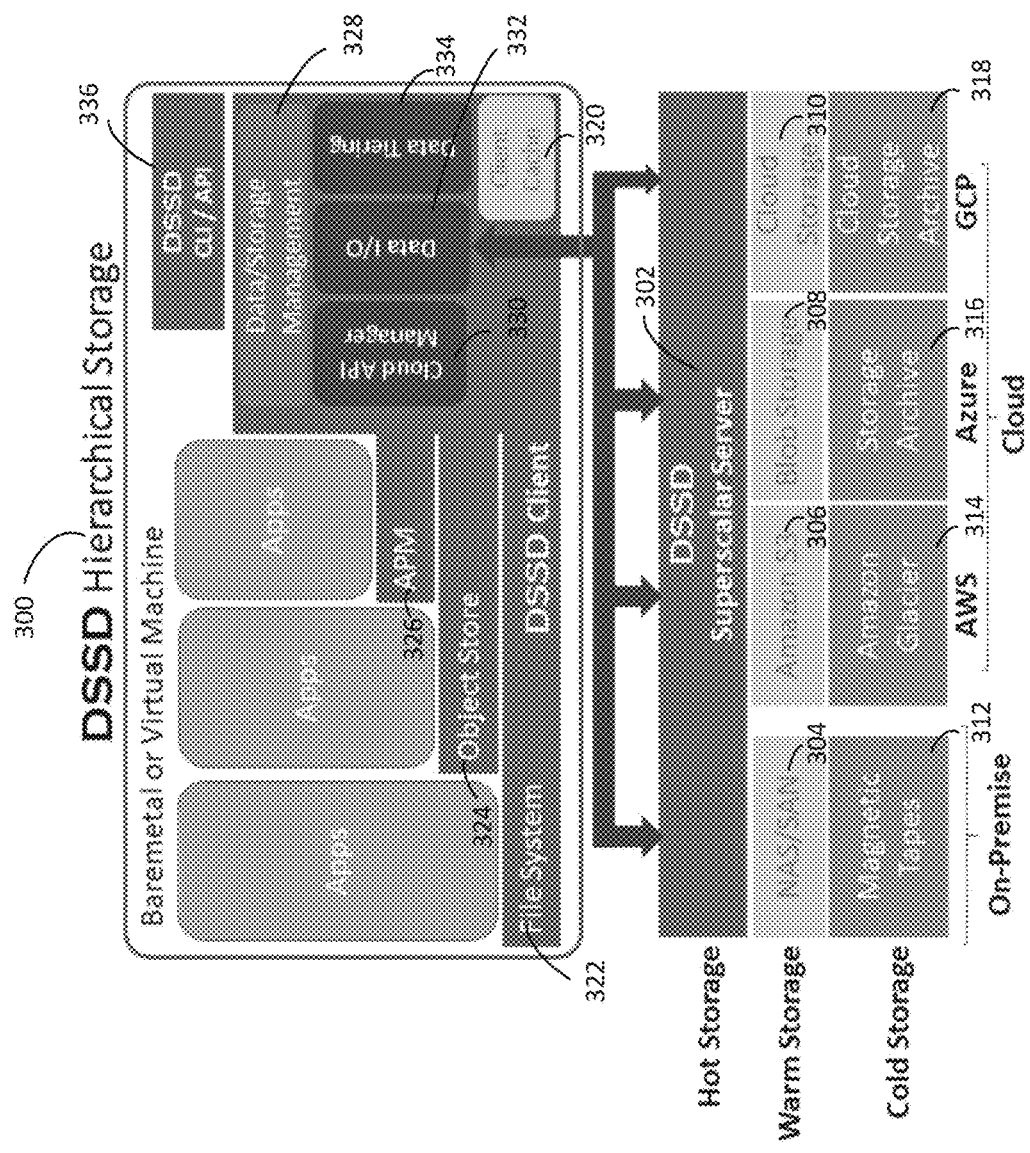
FIG. 3 illustrates a DSSD hierarchical storage architecture, according to some embodiments

FIG. 3 illustrates a hierarchical storage architecture 300 of DSSD and associated high-level functionalities. In DSSD, data can be tiered into hot data, warm data, and cold data. The hot data can reside in Superscalar Servers 302. The warm data can be in on-premise NAS/SAN 304, or in a public cloud such as AWS S3 306, Azure Blob 308, Google Cloud Platform (GCP) Cloud Storage 310, etc. The cold data can reside in on-premise magnetic tape drives 312, or in a public cloud like AWS Glacier 314, Azure Storage Archive 316, GCP Cloud Storage Archive 318, etc.

As shown in FIG. 3, on the bare metal (or virtual machine), DSSD may include:
1. a client cache 320 (e.g., a single MOS) for storing name/data cached from the servers 302-318;
2. a file system view 322 for transparent access into the unified data residing in the heterogenous storage architecture. The heterogenous storage architecture comprises of diverse types of storage architectures for hot, warm, and cold data;
3. an object store view API 324 for programmatic access to the unified data residing in the heterogenous storage architecture;
4. an Application Performance Management (APM) API 326 for application programmers to debug bottlenecks in applications, where the debug is based on feedback obtained from statistical information provided by DSSD on storage and network operations;

5. Data/Storage Management infrastructure 328 which provides various services including:
   a. a Cloud Manager 330 for managing APIs of various public and private clouds such as AWS, Azure, and GCP for role/access control, security management, etc;
   b. a uniform interface 332 to access data from DSSD servers, on-premise storages, and cloud storages; and
   c. a data tiering logic 334 to determine which name and data blocks are hot, warm, and cold, and transparently transfer the data to corresponding storage locations; and
6. a DSSD Command Line Interface (CLI) 336 for users to control DSSD configurations, to query statistical information, and to initiate commands to perform operations including backup, suspend, resume, etc. An API is also provided by DSSD for programmatic control of the same functionality.

Figure 4:
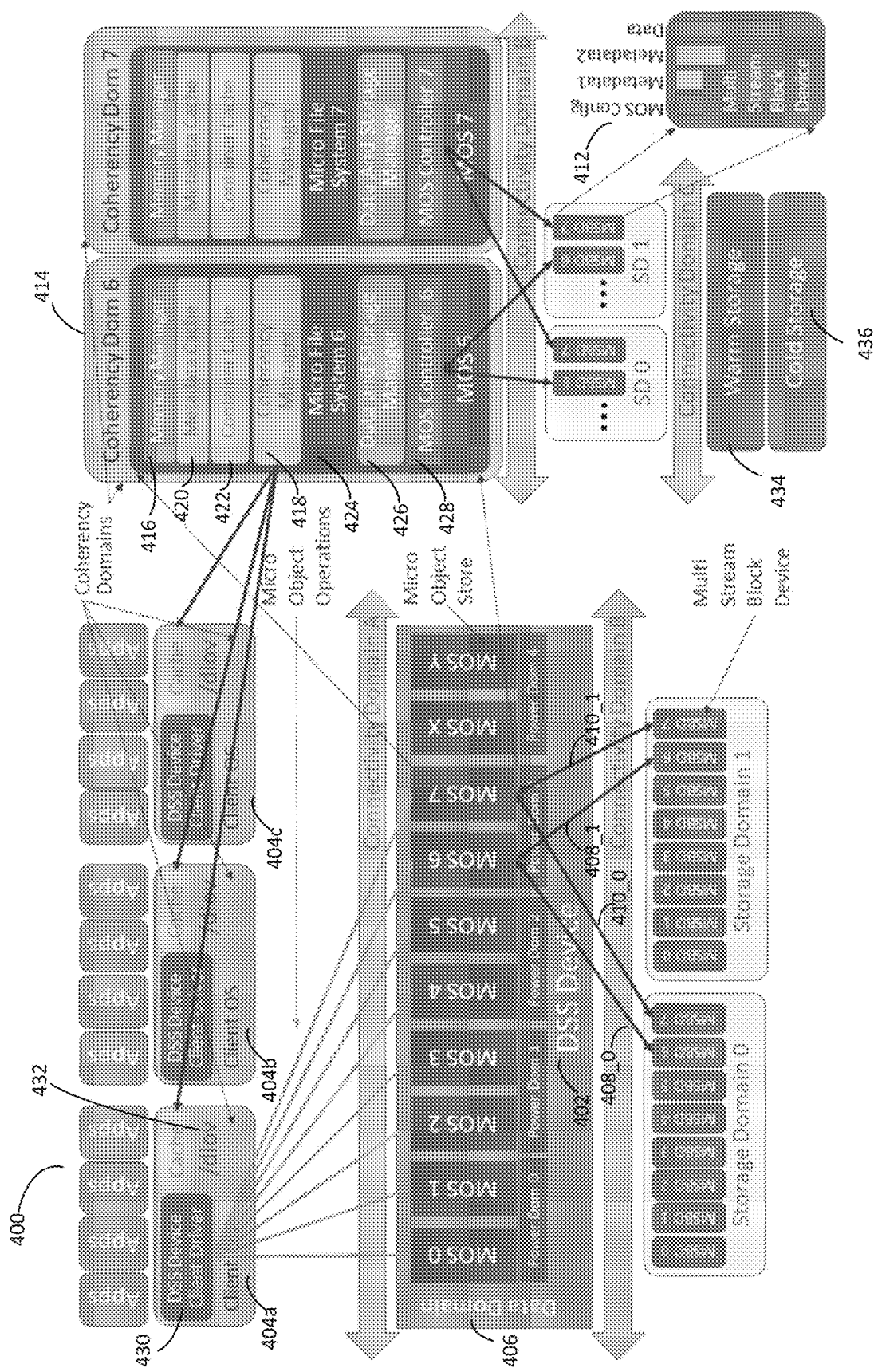
FIG. 4 illustrates a hardware implementation of a DSSD system, according to some embodiments.

FIG. 4 illustrates the detailed architecture 400 of DSSD. This figure describes an example hardware implementation of DSSD. The DSSD or DSS Device 402 comprises an arbitrary number of micro object stores or MOSs. In one implementation, each MOS may be an individual PCI Express component, and the entire DSS device 402 communicates with clients (e.g., 404a, 404b, 404c) using multiple connectivity mechanisms such as MR-IOV, high speed networks like Ethernet or Infiniband, etc. The connectivity mechanisms comprise the connectivity domain A.

DSSD separates the information/data flow into a data domain 406 and storage domains (e.g., storage domain 0 and storage domain 1). MOS operates on the semantics of the information in the data domain 406, while information/data is physically stored in the storage devices of a storage domain. Each MOS may be in a separately powered unit or power domain. Alternatively, multiple MOSs may reside inside the same power domain as shown in FIG. 4. For example, MOS 0 and MOS 1 are in the same power domain 0. Of the 10 MOSs shown in FIG. 4, eight MOSs, i.e., MOS 0 through MOS 7, are in active use. The other two MOSs, i.e., MOS X and MOS Y, are redundant standby. When one of the active MOSs (MOS 0 through MOS 7) fails, the standby MOS takes over as explained below.

The storage domains contain the storage devices such as HDD or flash disks like SSD or NVMe for storing data. The storage domains are logically grouped into MSBDs. An MSBD is a unit of storage or a block device presented to a MOS. Each MOS has a MOS controller. For example, MOS 6 has a MOS controller 428. Each MOS controller connects to MSBDs. The number of MSBDs associated with the MOS controller is determined based on a replication factor requested by the DSSD. For example, if the replication factor is configured to be 2, as shown in the example of FIG. 4, each MOS controller would connect to two MSBDs. The MOS controller will be described in more detail below in FIG. 6. Each of the MSBDs connected to a MOS controller and to the corresponding MOS resides in separate storage domains. For example, MSBDs 6 on separate storage domains 0 and 1 connect to MOS 6 via 408_0 and 408_1, and MOS 7 has connections 410_0 and 410_1 to MSBDs 7 on separate storage domains 0 and 1. Since each storage domain is an independent power domain, when a storage domain fails, at most one MSBD of each MOS will fail, thereby increasing the tolerance for failure.

An MSBD provides multiple streams of data 412 as a collection of an arbitrary number of raw disks or macro disks, which will also be further explained below in FIG. 6. In some embodiments, stream 0 or HDD raw disk(s) may contain MOS configuration, stream 1 or flash raw disk(s) may contain metadata 1 (e.g., basic data structures such as the core of hash tables, allocators, etc.), stream 2 or flash macro disk(s) may contain metadata 2 (e.g., containerized portions of metadata such as hash buckets of a hash table), and stream 3 or HDD macro disk(s) may contain containerized data corresponding to data blocks of files/objects. The connectivity domain B defines the connectivity mechanisms between the DSS Device or MOS to the storage domains. The connectivity domain B can be any of Fabric (e.g., Ethernet or Infiniband), Fiber Channel, iSCSI, PCI Express, HBA, Internet, etc.

The view 414 exploding the constituents of MOS 6 and MOS 7 illustrates the detailed architecture of a MOS. Each MOS is a coherency domain. There is a unique location in memory where any data managed by a MOS can be coherently accessed. In the example of FIG. 4, although each bit of data managed by MOS 6 gets replicated across MSBD 6 on storage domains 0 and 1, every reference (e.g., operations such as read or write) to any block of data will be through memory. A read operation would populate a unique copy of each block in memory, for example, paged in and out on demand by MOS's memory manager 416. A write operation would write to this memory block. Also, MOS will write this memory block to storage in MSBDs. This facilitates DSSD to manage data structures in disk using memory locks, which are significantly more efficient than disk locks. Additionally, reads and writes are from/to memory and not from/to storage devices in MSBDs, and hence are much faster.

Each MOS is designated as a Coherence Domain for the data it manages for additional benefits. Coherency manager 418 locates where a block of data is coherently alive. For example, the block of data can be in the caches maintained by MOS's memory manager 416 on the server or in the cache of one of the client nodes. The coherency manager 418 ensures that owner(s) of the data block have permission to read and/or write the block. When a block is held by one owner and a request to read/write the block comes from another owner/client, the coherency manager 418 ensures that either the previous owner invalidates its cache (e.g., by writing back the contents via a shootdown process) or the data from the owner's cache is coherently transferred to the requestor (e.g., by cache-to-cache transfer).

In some embodiments, the memory manager 416 manages two types of memory caches: metadata cache 420 and container cache 422. The metadata cache 420 is a direct-mapped cache where the core metadata data structures are mapped in memory as a flat file. The core metadata are of small size and can reside in memory throughout its lifetime. The container cache 422 is managed by the memory manager 416 using demand paging, which allows a similar type of data to be packed into a container of a specific size (e.g., 4 MB). Containers are mapped in and out based on reference(s).

The micro file system (MFS) in a MOS, e.g., MFS 424, provides the interpretation and execution of micro object operations dispatched by a client. For example, the client may request to open a file/object, read a block of data, query the presence of a file/object, etc., at a micro object level. The MFS 424 is free to decide upon the final representation of the micro object on the storage devices associated with the MSBDs of the MOS.

The data and storage manager (DSM) of the MOS, e.g., DSM 426, manages a variety of services such as (a) managing APIs of various public and private clouds like AWS, Azure, and GCP for role/access control, security management, etc.; (b) providing a uniform interface to access data from DSSD servers, on-premise storages, and cloud storages; (c) using data tiering logic to determine which name and data blocks are hot, warm, and cold; and (d) transparently transferring the determined data to an appropriate storage location. Connectivity domain C defines the connectivity mechanisms to access the warm/cold storage options such as 434 and 436.

A DSSD Client Driver in the client nodes, e.g., 430, implements (a) the local cache for name and data corresponding to micro objects living in the servers; (b) the mount points for the DSSD file system, where "/diov" 432 is an example directory in which the DSSD file system is mounted, and access to any files under this directory is optimized by DSSD; and (c) the API interfaces for object store(s), Application Performance Management (APM), network monitoring, backup and disaster recovery, etc. Although the above functionalities are mainly described based on components of a particular MOS (e.g., MOS 6) or client (e.g., client 404a), it should be noted such description may also be applied to other components of other MOSs and other clients.

Figure 5:
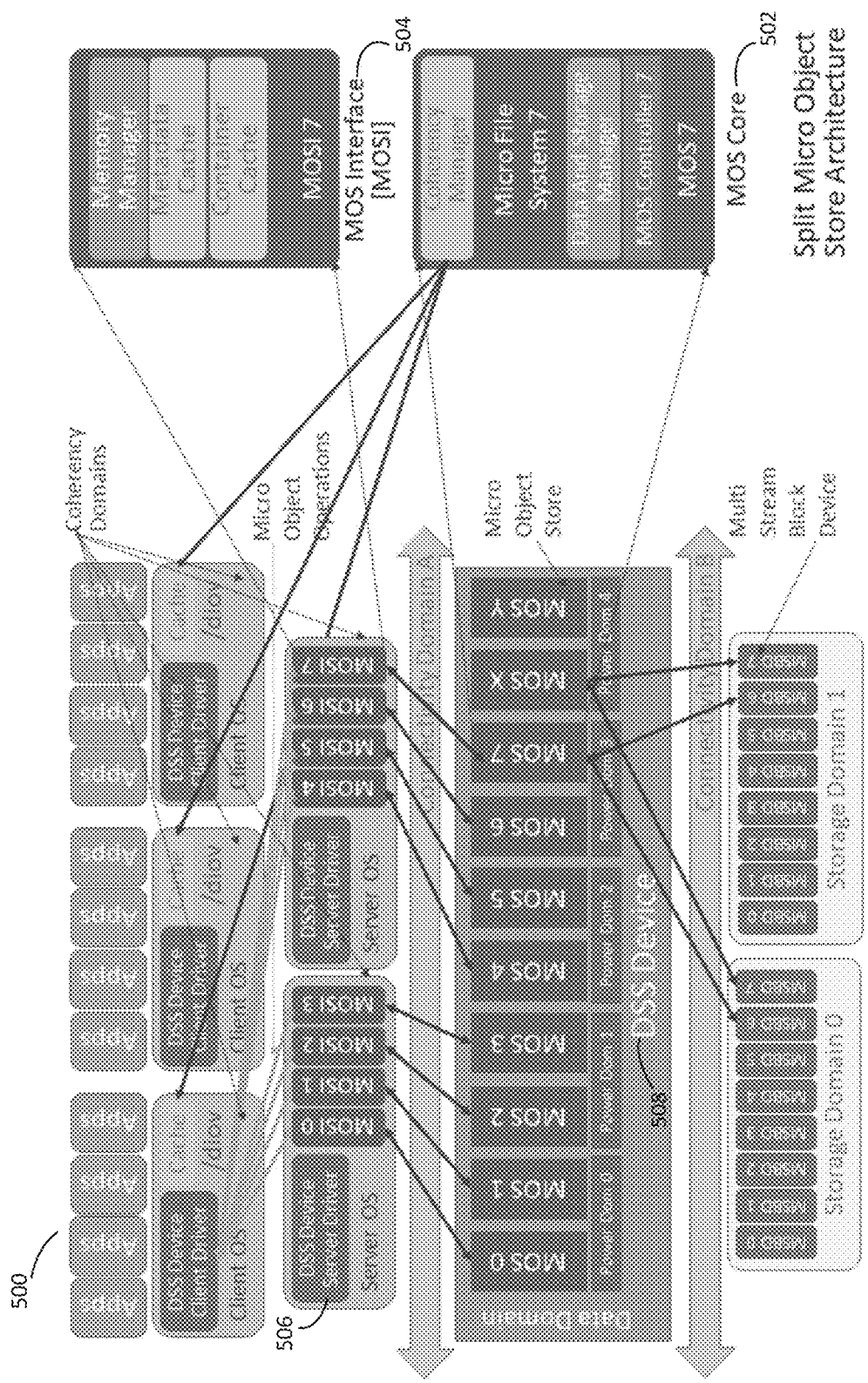
FIG. 5 illustrates a hybrid hardware and software implementation of a DSSD system, according to some embodiments.

FIG. 5 illustrates a hybrid architecture 500 for a hardware/software implementation of DSSD. The architecture 500 is one of many possible hybrid architectures. Since FIG. 5 shares many similarities with FIG. 4, for brevity and clarity, the description herein will only focus on the differences between the two figures. As depicted in FIG. 5, a MOS is split into two parts: a MOS Core 502 and a MOS Interface (MOSI) 504. The MOS Core 502 implements the coherency manager, Micro File System, Data and Storage Manager, and MOS controller. The MOS Interface 504 implements the memory manager and caches. This architecture is particularly advantageous when it is difficult to maintain a large memory cache in the hardware MOS (e.g., implemented on a co-processor board). The DSSD Server Driver 506, in this case, implements the MOS interfaces such as MOSI 504. Based on the architecture 500, micro object operations are first directed to the MOSI 504. If a request hits in the memory cache, the request is immediately processed. Otherwise, the request is handed back to the DSSD Server Driver 506. The DSSD Server Driver 506 then passes the request onto the MOS in the DSS Device 508 that is implemented with hardware.

Figure 6:
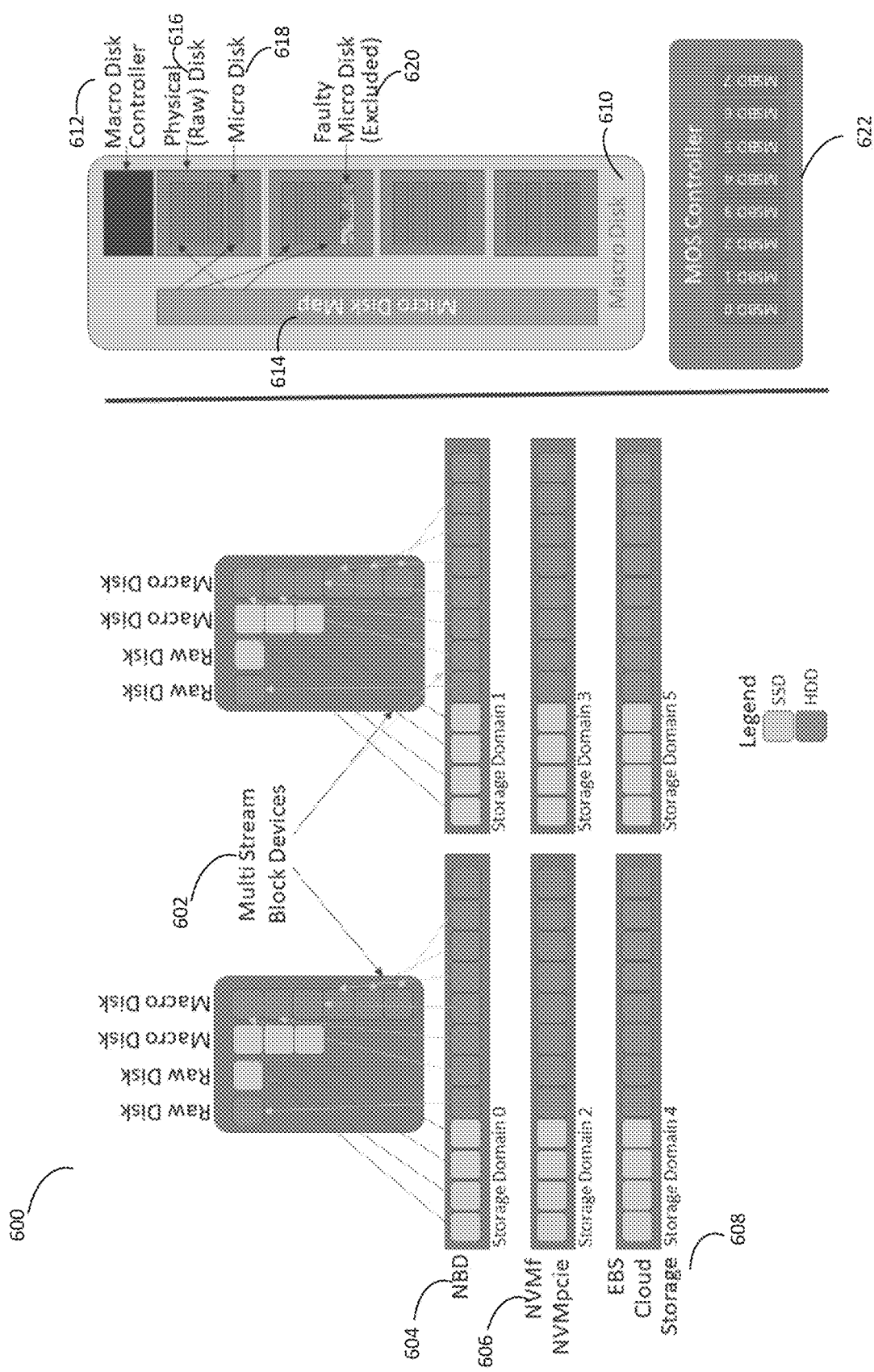
FIG. 6 illustrates views of a multi stream block device (MSBD), macro disk, and Micro Object Store (MOS), according to some embodiments.

FIG. 6 illustrates views of an MSBD, macro disk, and MOS controller. The composition of MSBD 602 from storage domains is shown in 600. A storage domain can be composed of multiple architectures, some of which have been described above. In example 600 of FIG. 6, three different options: 604, 606, and 608 are discussed. The Network Block Device (NBD) 604 can be a server that exports its disks via software components. The software components may include a Linux NBD, a JBOD or JBOF connected over HBA or Fabric, a SAN, an iSCSI storage, etc. The pNVMf or NVpcie 606 represents NVMe devices over PCI Express or Fabric, which is a recent popular choice. The cloud storage 608 includes storage like AWS EBS, Azure Blob, GCP Cloud storage, etc. In each of 604, 606, and 608, discrete HDD or flash disks from the storage domains may be orchestrated into streams of the MSBD 602. Each MSBD 602 can have an arbitrary number of streams. Each stream can be a raw disk (i.e., unformatted disk) or a macro disk.

FIG. 6 also illustrates an architecture of a macro disk 610. The macro disk 610 is a homogeneous string of raw disks of a particular type (e.g., HDD or Flash). The macro disk 610 includes a macro disk controller 612, which primarily identifies the binding of the raw disks 616 to the macro disk 610 and maintains a micro disk map 614. A raw disk 616 is logically organized as a string of storage units of finite size, which are referred to as micro disks 618. The use of micro disks 618 is beneficial when it is needed to quarantine a portion 620 of the raw disk that turned faulty (e.g., due to bad sectors) and further to reconstruct storage on a standby micro disk from a mirror. The operation based on micro disks 618 is much easier than the operation of copying entire disks when a disk has a typical size of 16 TB, 32 TB, or larger. The micro disk map 614 is a dynamic map of micro disks 618 to the offset of storage in the macro disk 610. The micro disk map 614 makes it possible for dynamically quarantining and replacing micro disks 618 when a storage error is encountered.

FIG. 6 further depicts a composition of a MOS controller 622 as an arbitrary number of MSBDs. There will be as many MSBDs in the MOS controller 622 as a replication factor. The replication factor may be configured by an administrator of a cluster. During meiosis, the MSBD configurations of the MOS controller 622 are transferred to the MOS of a target physical node, and the storage devices corresponding to the MSBDs are unmounted on the source node and remounted on the target node.

Figure 7:
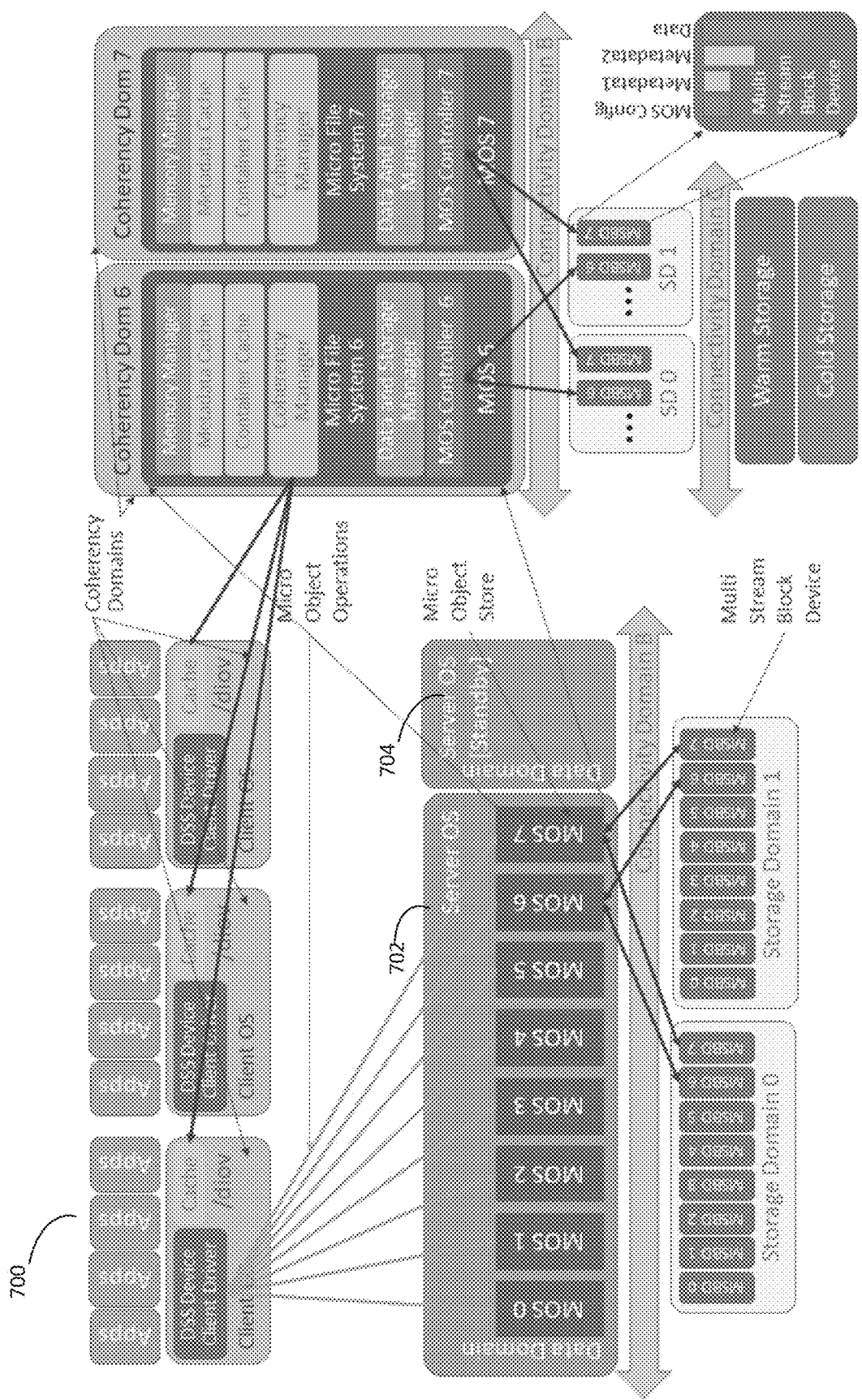
FIG. 7 illustrates a software implementation of a DSSD system, according to some embodiments.

FIG. 7 illustrates a software implementation 700 of DSSD. Since FIG. 7 shares many similarities with FIG. 5, for brevity and clarity, the description herein will only focus on the differences between the two figures. As depicted in FIG. 7, MOS is implemented in software in a server node. The cluster may start with a single physical server 702 implementing all the MOS nodes. Each meiosis or meiosis stage will introduce more physical servers and the MOS from the original server(s) will be migrated to a new server(s). In a typical scenario, when the number of physical servers is doubled, half of the MOSs are migrated to a corresponding new physical server. As mentioned above, the migration of MOSs does not need to be a division by power of 2. In some embodiments, there will be at least one standby physical server (e.g., 704), to take on the tasks of the MOS if one of the active servers (e.g., 702) were to fail abruptly. The migration of storage and MOS configurations in software solutions are similar to those in the hardware and hybrid solutions discussed above in FIGS. 4 and 5.

Figure 8:
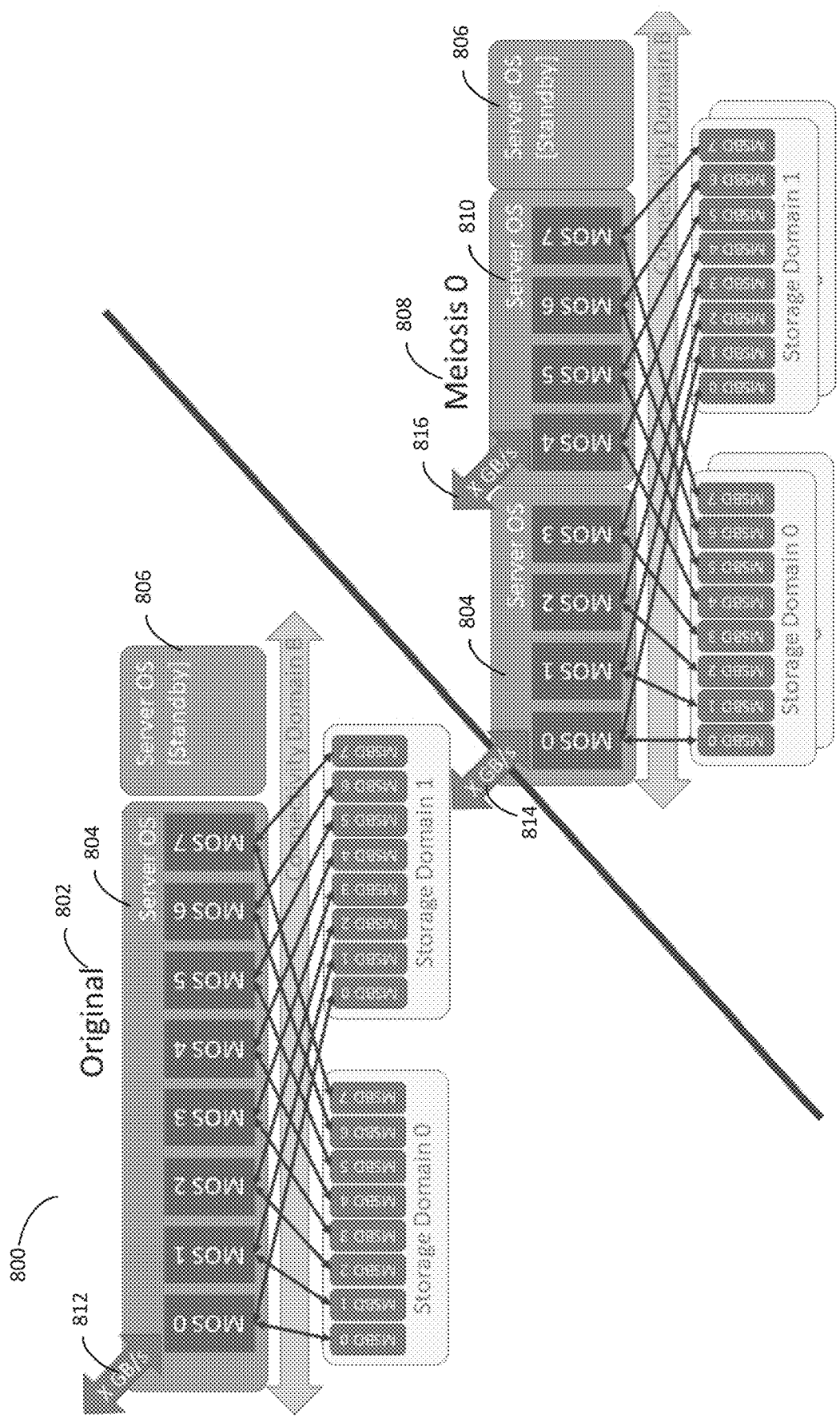
FIG. 8 illustrates an example original cluster configuration followed by a first meiosis (meiosis 0), according to some embodiments.
Figure 9:
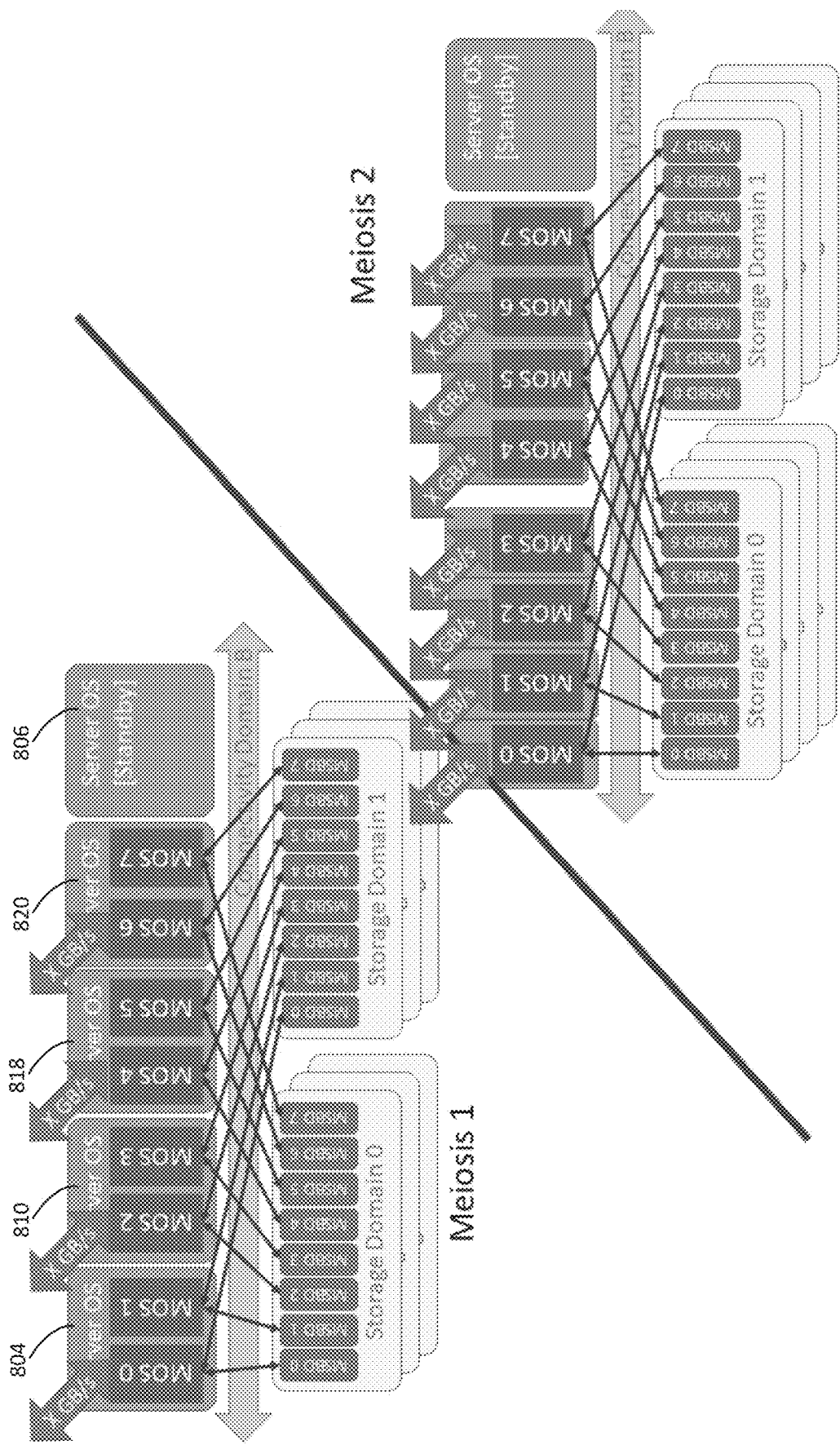
FIG. 9 illustrates an example cluster configuration after meiosis 1 and 2, according to some embodiments.

FIGS. 8 and 9 illustrate a meiosis process 800. Meiosis or the meiosis process 800 includes one or more operations by which new physical servers are added and MOSs from the existing physical servers are migrated to the new physical servers. As shown in FIG. 8, the original configuration 802 includes an active server 804 with eight MOSs and a standby server 806 associated with storage domains (e.g., domain 0 and domain 1). A storage domain contains the storage devices associated with MSBDs that are connected to each of the MOS. The original configuration 802 occurs prior to meiosis, and thus is at Stage 0. When Stage 1 starts, during meiosis 0 at 808, one new physical server 810 is added and half of the MOSs (i.e., MOS 4 through MOS 7) are migrated from the original server 804 to the new server 810. The MSBDs corresponding to the MOSs are first transferred to the MOS controllers in the new server 810, and then the storage devices corresponding to the MSBDs are unmounted from the original server 804 and remounted onto the new server 810. It can be seen in FIG. 8, after meiosis 0, the physical capacity of the cluster to perform computing, storage, and network operations have doubled, and the effective throughput has also doubled, for example, from X GB/s at 812 to 2X GB/s at 814 and 816. After meiosis 0, new meiosis Stage(s) such as meiosis 1 and meiosis 2 starts if more resources are needed, for example, peak resource usage (e.g., CPU, memory, and storage) of the existing servers is reached. FIG. 9 illustrates the configurations after meiosis 1 and meiosis 2. Meiosis 1 results in doubled servers and half MOSs associated with each server as compared to meiosis 0. Therefore, when meiosis 1 is complete, in addition to servers 804 and 810, two new servers 818 and 820 are added to make a total of four physical servers. Each server is associated with two MOSs and the throughput is 4X GB/s. Similarly, after meiosis 2 is complete, the configuration has eight physical servers, each running a single MOS, with an effective throughput of 8X GB/s.

Figure 10:
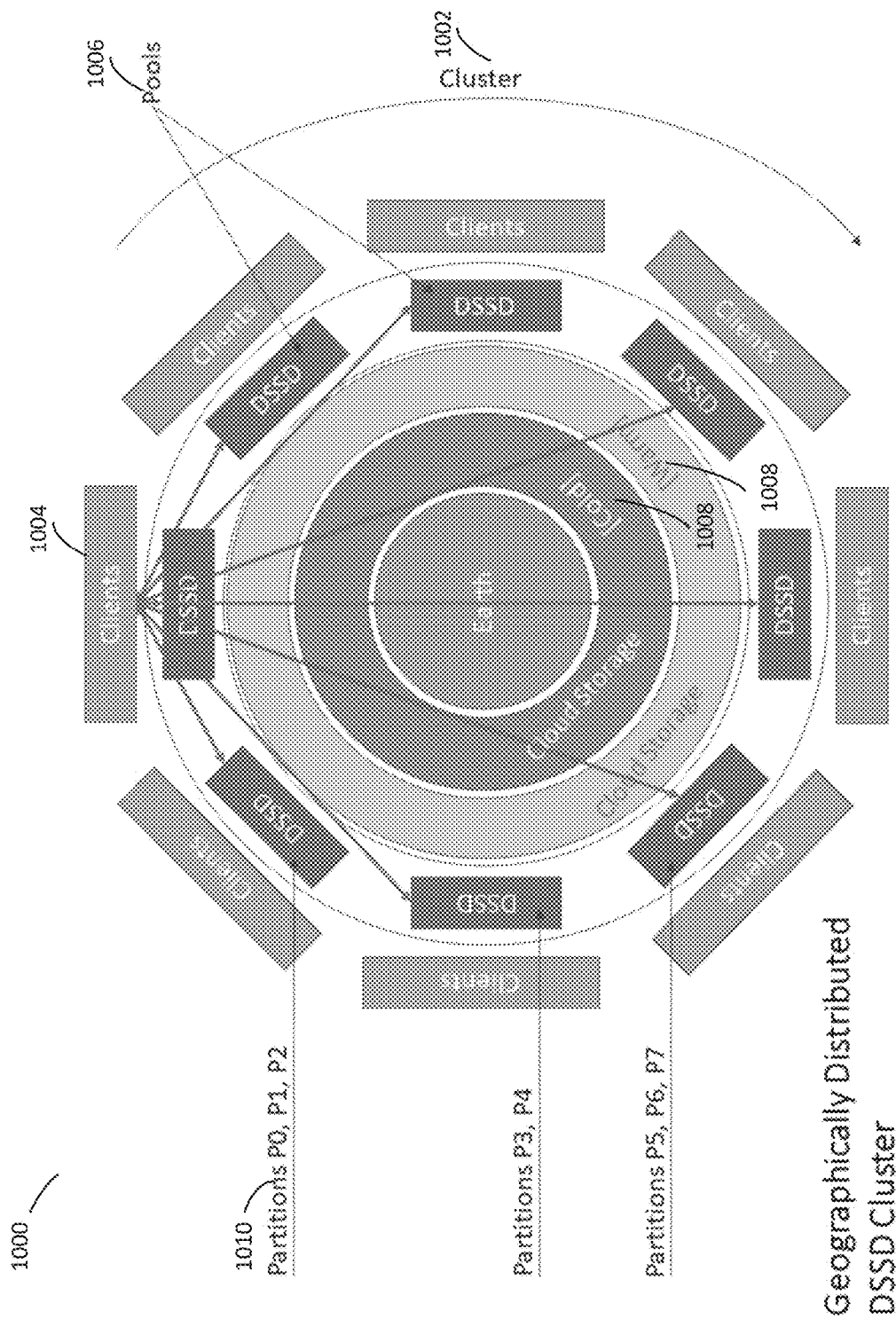
FIG. 10 illustrates a topology of a geographically distributed DSSD cluster, according to some embodiments.

FIG. 10 illustrates a topology 1000 of a geographically distributed DSSD cluster 1002. Clients 1004, DSSD devices or pools 1006, and warm/cold storages 1008 on the cloud form the DSSD cluster 1002. Each DSSD pool 1006 comprises an arbitrary number of physical servers running DSSD server(s). Each pool can house one or more partitions 1010. A partition spreads across the MOSs that comprise the DSSD device of the pool, where each MOS holds a partial partition. A partition is essentially a disk partition for a file system or a bucket for an object store. Reads and writes to a partition will span all the MOSs (and hence all the physical servers) associated with a pool or DSSD Device 1006. The detailed configuration of the cluster 1002 includes, but is not limited to, the configuration of physical servers (clients and servers) in each pool, the configuration of MOSs residing on each server, the configuration of MSBDs associated with each MOS, etc. Such configurations are maintained by a DSSD service named "divadmin." Each client and server connect to a "divadmin" server at the time of initialization, obtain a global cluster configuration, and preserve the configuration in memory. When the global cluster configuration is dynamically changed, the "divadmin" server may notify each client and server of the configuration change via one or more sockets opened for these notifications.

Figure 11:
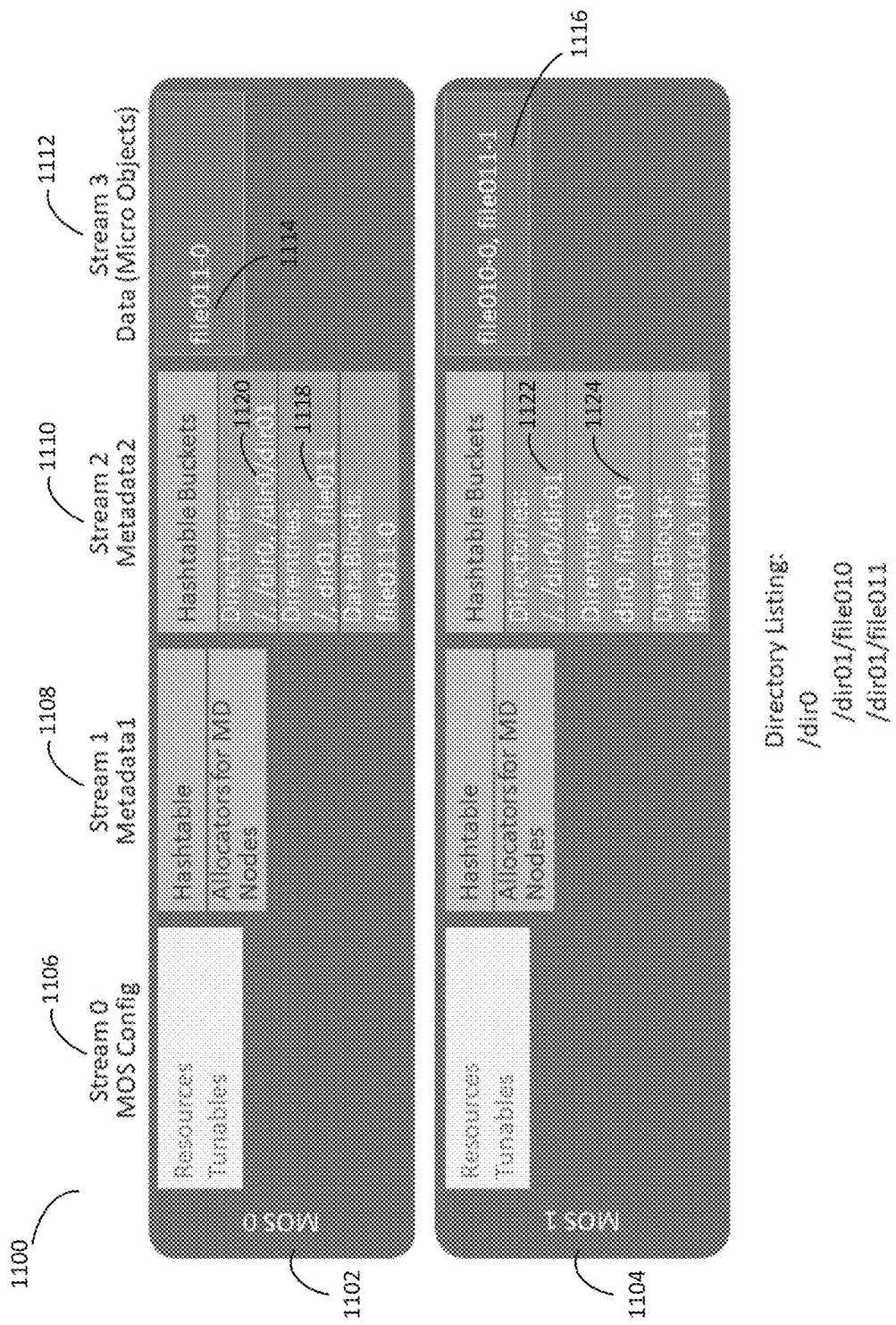
FIG. 11 illustrates data distribution on MSBD and parallelization of name nodes, according to some embodiments.

FIG. 11 illustrates data distribution on MSBD and parallelization of name nodes, according to one embodiment. The data is distributed across different types of streams of each MSBD associated with each MOS. The example of FIG. 11 shows a pool or a DSSD Device with two MOSs: MOS 0 at 1102 and MOS 1 at 1104. Each MOS is associated with two or more MSBDs that have identical or replicated content. As shown in FIG. 11, stream 0 of the MSBDs at 1106 may be raw HDD disks containing MOS configurations such as available resources and tunable parameters. Stream 1 at 1108 may be a flash raw disk with Metadata 1, i.e., core metadata data structures such as the core of hash tables, allocators, etc. Stream 2 at 1110 may be a macro disk with flash disks organized as containers on micro disks containing Metadata 2, i.e., the bulk of metadata such as the actual hash buckets of the hash tables, information nodes associated with files/object storage such as directories, direntries, and data blocks, etc. Stream 3 at 1112 may contain micro objects, i.e., the actual data blocks of the files/objects.

In prior storage systems, it is difficult to implement true parallelization of name and data nodes. As illustrated in FIG. 11, DSSD provides a solution for parallelization based on unique features associated with MOSs and MSBDs. For example, the information nodes in metadata of Stream 2 at 1110 have the following semantics on a per-MOS basis:

1. Direntries are used to fast manage entries in a directory. Direntries herein are similar to Linux i-nodes in that the direntries contain all the attributes of a file/object. The attributes include, but are not limited to, names, permissions, ownership, time of creation, time of access, time of modification, unique identifiers (e.g., i-node numbers), file/object sizes, block sizes, attribute locks, etc.
2. Directories contain lists of direntries for files/objects belonging to each physical directory in a file system or partition. A physical directory in a partition may have a directory entry in each MOS depending on how files/objects belonging to the physical directory was distributed across the various MOSs of the DSSD device.
3. DataBlocks are the information nodes corresponding to the actual data blocks or micro objects in Stream 3. There is a one-to-one correspondence between the datablock information nodes and the data blocks in Stream 3. A single large file may have multiple micro objects associated with it living across multiple MOSs in the DSSD device.

To understand the complexities of parallelizing name and data nodes as illustrated in FIG. 11, a file with a pathname "/dir0/dir01/file011" is considered. The file is associated with two micro objects: "file011-0" and "file011-1." The direntry 1118 for the file "file011" is in MOS 0, which contains all the attributes for "file011." Also, both MOS 0 and MOS 1 contain directory entries for "/dir0/dir01," respectively at 1120 and 1122. MOS 0 contains the file direntry for "file011" at 1118 and MOS 1 contains the file direntry for "file010" at 1124. Since both these files are under the "/dir0/dir01" directory, MOS 0 and MOS 1 both contain the "/dir0/dir01" directory at 1120 and 1122. Moreover, MOS 0 contains datablock entry for micro object "file011-0" at 1114 and MOS 1 contains the datablock entry for micro object "file011-1" at 1116.

Based on the above name and node configurations, operations such as Linux "link" and "symlink" may find that the source and destination direntries reside in different MOSs. Operations such as "rmdir" and "readdir" may need to broadcast requests to all MOSs since the physical directory resides in partial bits across multiple MOSs in the same DSSD device. Operations such as "read" and "write" may perform attribute lock in addition to actually reading or writing data. The "read" operation may lock and read the attributes for file/object sizes and permissions (e.g., from the direntry in a potentially different MOSs) before accessing the corresponding micro object. The "write" of a micro object may lock and update the sizes and times (e.g., time of access, time of modification) after writing the data to the MSBDs of the MOS containing the micro object.

Figure 12:
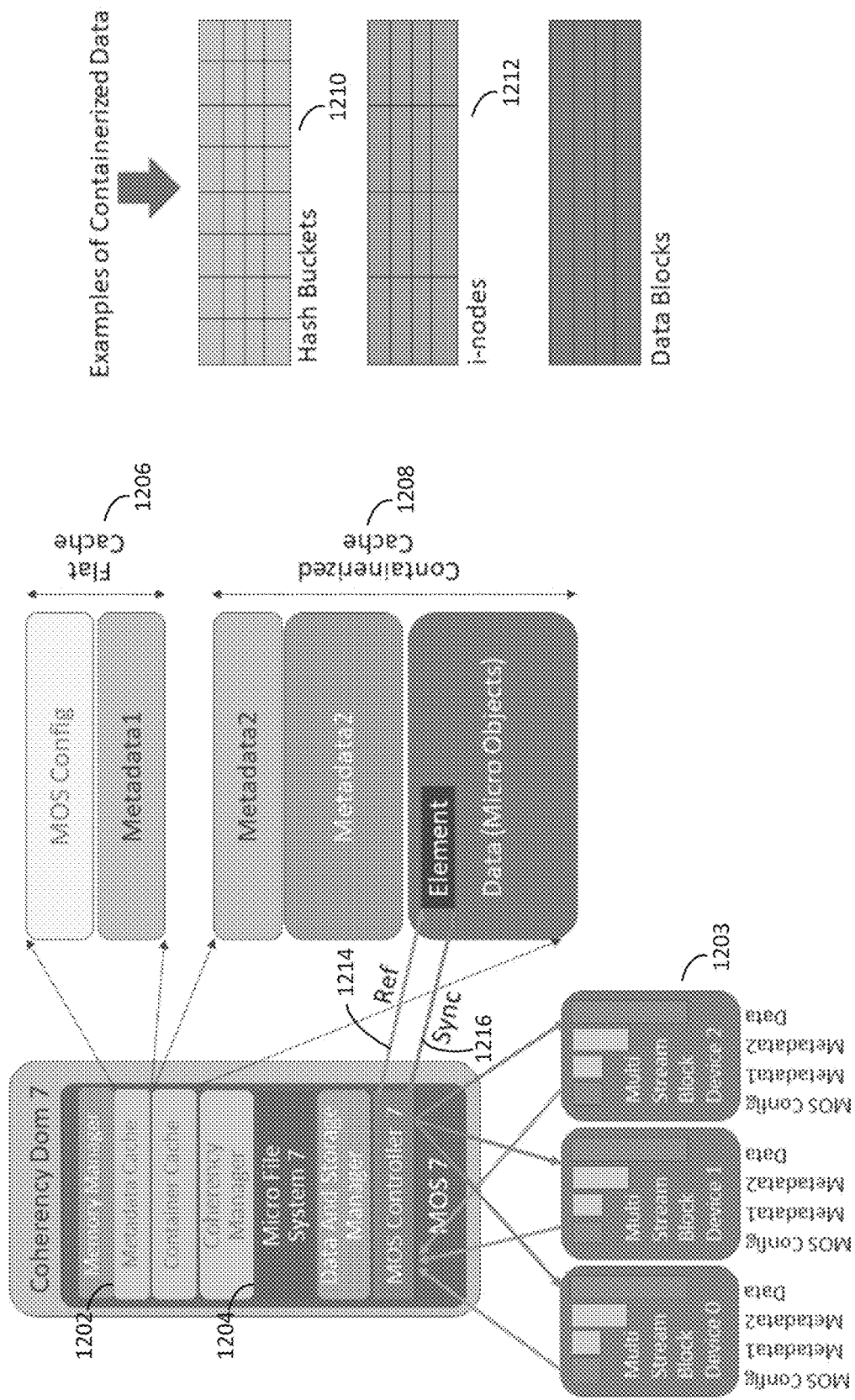
FIG. 12 illustrates DSSD memory mapping and coherent caches for metadata and data, according to some embodiments.

FIG. 12 illustrates DSSD memory mapping and coherent caches for metadata and data. The memory manager 1202 is primarily responsible for mapping various streams of MSBDs 1203 onto memory and maintaining the streams coherently in association with coherency manager 1204. DSSD enforces that all data from storage devices are read into memory cache (e.g., via reference operations 1214) before use, and all data are written to memory cache (e.g., via sync operations 1216) before being written to storage devices. This ensures that memory locks can work effectively on all data structures even when the data structures reside or live on disks. This also improves system performance because most reads and writes are directed to memory caches.

FIG. 12 shows how stream 0 containing MOS configuration, stream 1 containing Metadata 1, stream 2 containing Metadata 2, and stream 3 containing data blocks in FIG. 11 are mapped to memory. As shown in 1206, MOS configuration and Metadata 1 correspond to data residing in raw disks. Small data such as MOS configuration and Metadata 1 may be maintained as a single file on their respective streams 0 and 1. The memory manager 1202 may map this small data directly into memory during initialization of MOS, where the small data stay resident until the MOS is shut down. On the other hand, larger data such as Metadata 2 and data blocks respectively in streams 2 and 3 are organized as containers of a finite size (e.g., 4 MB) on the micro disks of the MSBD's macro disks.

The memory manager 1202 maps the containers in and out based on their references. The memory manager 1202 may use a set of policies, e.g., Least Recently Used (LRU), to evict containers in memory to make space for new containers. For example, the memory manager 1202 may maintain statistics of reference counts and modification times of each container to make a reclamation decision. In a preferred embodiment, the memory manager 1202 applies a policy that is based on velocity. The velocity indicates the number of references in a unit time. This policy helps preserve data that are accessed periodically rather than in bursts. The memory manager 1202 uses containers to effectively organize data of various sizes. Typically, one container contains only data of a particular size. As shown in the example of FIG. 12, containers containing hash buckets in 1210, in general, contain only hash buckets. Containers containing i-nodes in 1212, in general, contain only i-nodes. This helps reduce fragmentation and speed up the reuse of the space, when data is rapidly deleted and recreated.

In prior systems, containers may remain partially empty when there is no sufficient number of objects for occupation, which does not optimize the usage of containers. DSSD solves this problem by combining suitable objects of comparable sizes to occupy the same container in application designs. By default, DSSD enforces a write-through operation for memory caches to ensure that storage devices are updated at the same time as the memory caches. However, this can be relaxed to writeback (e.g., by a user) when the data is written to storage devices only at frequent intervals or at the end of a transaction.

Figure 13:
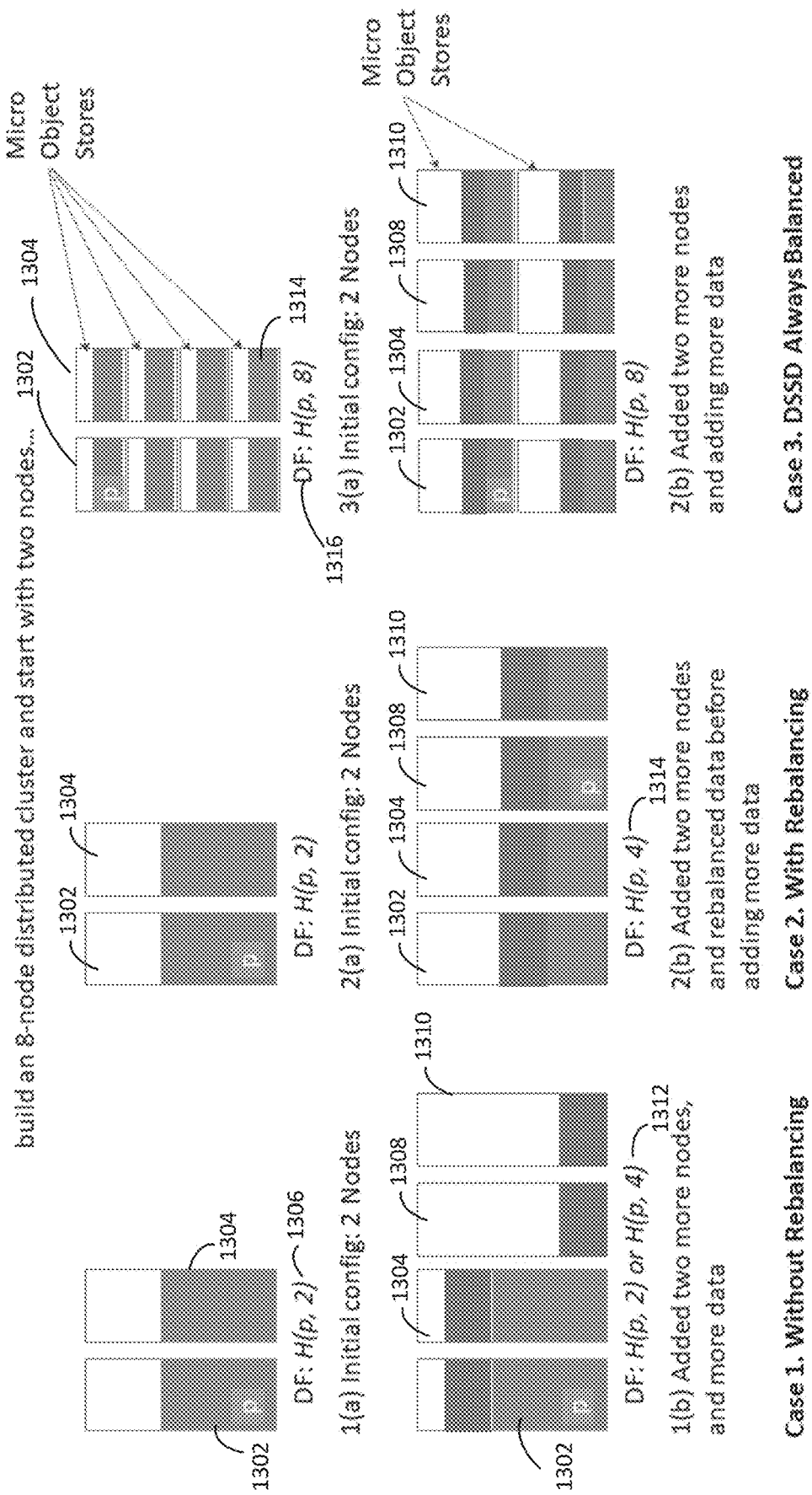
FIG. 13 illustrates a distribution function and data rebalancing in a distributed cluster, according to some embodiments.

FIG. 13 illustrates a distribution function and data rebalancing in a distributed cluster. The distribution function is used by DSSD for assigning names and data to MOSs. The distribution function keeps the data distribution balanced through multiple meiosis stages. Cases 1 and 2 illustrate distribution functions used by prior storage systems, which are inefficient as compared to the DSSD distribution function.

In case 1, the cluster is originated with two nodes 1302 and 1304, and data is populated into the storage devices. A distribution function H(p, 2) is used in 1306, where p is the pathname/objectname of a file/object and the number 2 indicates the arity of the cluster (i.e., parallelism). When the disks are close to being filled up (e.g., the usage is above a predefined threshold), two new nodes 1308 and 1310 are added to bring more storage space and to have more data populated. In this case, data is not rebalanced. As depicted, more data are stored in nodes 1302 and 1304 than in the new nodes 1308 and 1310. To find the file/object named "p," two searches of the distribution functions H(p, 2) and H(p, 4) in 1312 have to be conducted to make sure that the presence or absence of the required file/object is exhaustively determined. In case 2, the data is rebalanced across the nodes after the new nodes are added. A single lookup by H(p, 4) in 1314 can determine if the file/object p is present or not.

Case 3 shows balanced DSSD scaling. DSSD starts with a pre-provisioned scaling factor of 8, which indicates that the maximum size of the cluster will be 8. The two initial nodes 1302 and 1304 are configured to have a total of 8 MOSs with 4 MOSs per node. For example, 1314 is one of the four MOSs on node 1304. DSSD uses a single distribution function H(p, 8) in 1316 to add and retrieve data. When two new nodes 1308 and 1310 are added and meiosis migrates two MOSs from each of the initial/original nodes 1302 and 1304 to each of the new nodes 1308 and 1310, the distribution function still remains H(p, 8) in 1316. The data migration only includes unmounting the storage devices in the MSBDs from the original nodes 1302 and 1304, and remounting the storage devices onto the new nodes 1308 and 1310. There is no data copying and thus the migration is not expensive. Also, the data is always balanced in the original and newly added servers.

Figure 14:
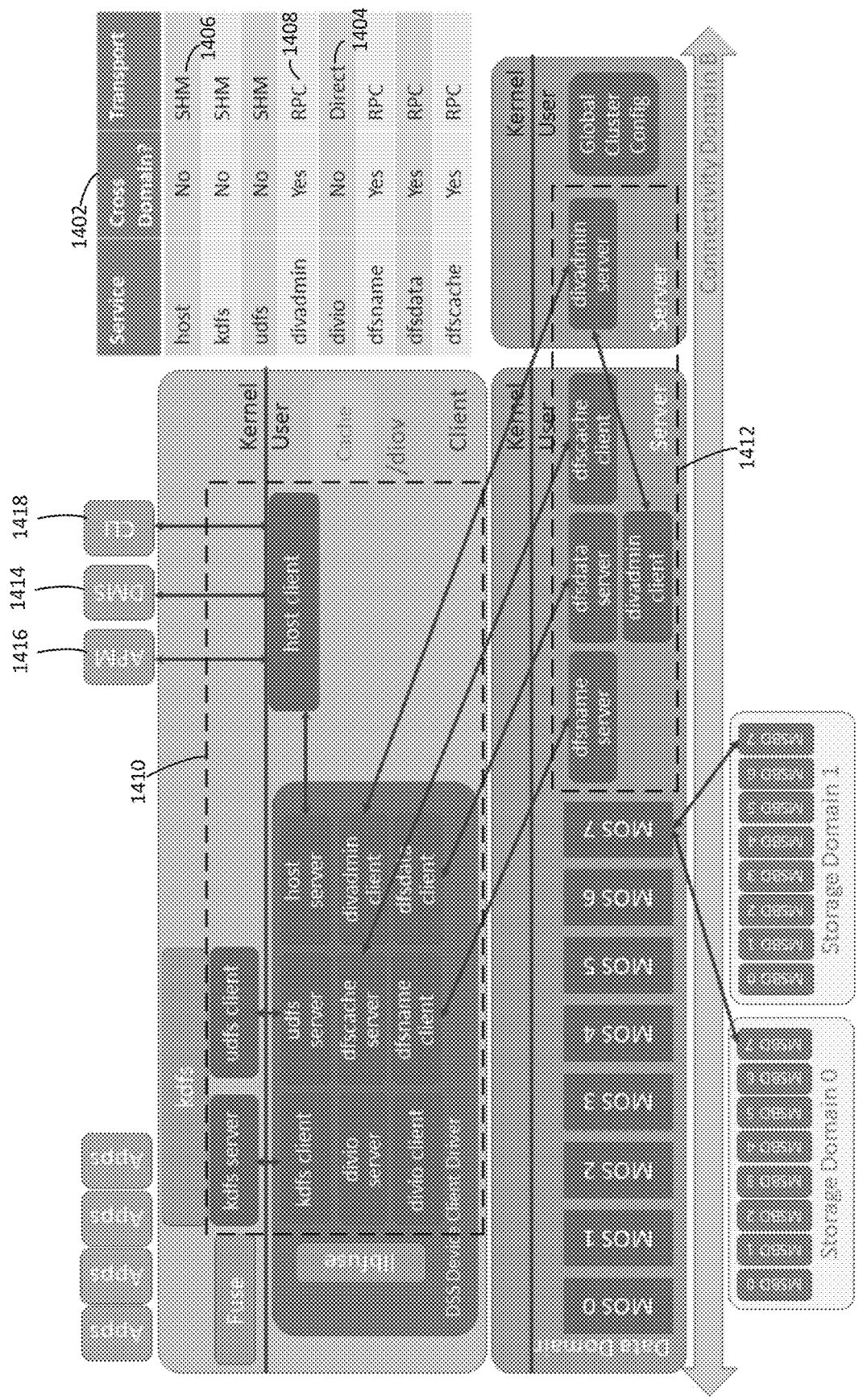
FIG. 14 illustrates a DSSD multi-transport service architecture, according to some embodiments.
Figure 15:
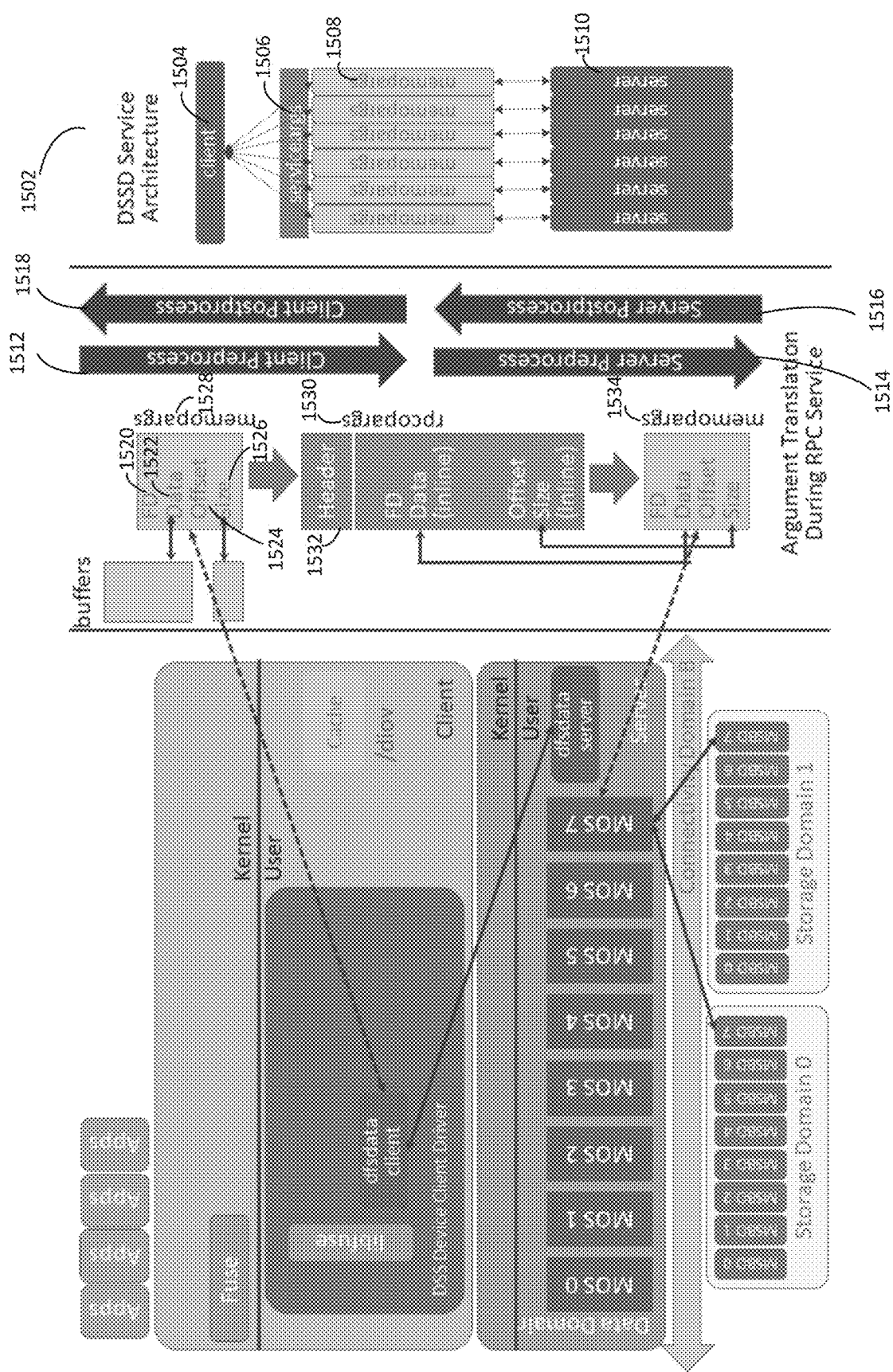
FIG. 15 illustrates argument processing during DSSD services, according to some embodiments.

FIGS. 14 and 15 illustrate a DSSD service architecture. The simplified illustration of the DSSD Service architecture is in 1502 of FIG. 15. A client 1504 intends to perform N operations. These operations can be heterogeneous operations. The client 1504 may perform all of N operations parallelly with a single service call. In some embodiments, the client 1504 creates an object 1506 called "serviceargs." The serviceargs object 1506 comprises N argument buffers or memopargs 1508. Next, the client 1504 populates the arguments for each of the N parallel operations in the corresponding memopargs buffer 1508 of the serviceargs object 1506, and fires a call to a service dispatcher (not shown). The call blocks until all the N operations complete. In some embodiments, the servers 1510 providing the requested operations may run on the same physical machine (or operating system) as the client 1504. In such a case, the client 1504 and servers 1510 are considered to be in the same context in the parlance of DSSD Service. In other embodiments, the client 1504 and servers 1510 are on one or more different physical machines or different contexts.

Referring to FIG. 14, as shown in table 1402, DSSD service provides different transports depending on whether a service runs in the same context. If the service runs in the same context, the service can either use a direct transport (e.g., 1404) or a shared memory (SHM) transport (e.g., 1406). The direct transport allows jobs/tasks to be directly dispatched by a DSSD client driver to a server in the same process context. In SHM transport, however, different processes use the serviceargs object maintained in a shared memory segment as the bridge to communicate with the DSSD client driver. If the service runs across different contexts, the service may use a Remote Procedure Call (RPC) transport (e.g., 1408), where the connectivity between a client and a server may be provided using multiple protocols such as Fabric (e.g., Ethernet or Infiniband), PCI Express, Internet, etc. The serviceargs object always refers to arguments in memory. For example, the memopargs may contain pointers to other memory buffers and objects. Clients and servers can communicate with each other in direct and SHM transports. When SHM transport is used, it needs to ensure that pointers in memopargs also point to data in shared memory segments. But in the case of RPC transport, the memopargs needs to be flattened out with all data being inlined into a format of "rpcopargs," which will be illustrated below in FIG. 15.

In some embodiments, four stages are involved in the argument processing of an RPC. A shown in FIG. 15, the first process is a Client Preprocess 1512, where the data in memopargs are transferred to rpcopargs with all data de-referenced by pointers that are inlined therein. The rpcopargs headers provide detailed information about how to interpret the data on the server side.

The second process is a Server Preprocess 1514, where the server receives the rpcopargs data and composes an internal memopargs structure to be passed to the dispatch functions. However, this time, the pointers in memopargs are pointers into the appropriate offsets in the incoming rpcopargs, and as a result, the operations performed by the server will directly update the memory inside rpcopargs.

The third process is a Server Postprocess 1516, where any specific finalizations are performed. In most times, the rpcopags is now ready for dispatch back to the client. The fourth process is a Client Postprocess 1518, where the data from the incoming rpcopargs are copied back to buffers pointed to by memopargs if the data is required (e.g., as in a read operation).

As a specific example of argument translation during RPC service, FIG. 15 illustrates a write operation that passes a filedescriptor, a data buffer, an offset, and a size. Corresponding to these Data and Size, there are pointers FD 1520, Data 1522, Offset 1524, and Size 1526 to memory buffers in memopargs 1528. When the rpcopargs 1530 is constructed, data dereferenced by these pointers is inlined into the rpcopargs 1530, and the rpcopargs headers 1532 are updated appropriately. The client dispatches the operation to the server. After the operation completes and the server returns rpcopargs back to the client, the client copies the contents of Size to the buffer pointed to by memopargs 1534. The data needs not be copied since it is a write operation.

Referring back to FIG. 14, it also illustrates various services in flight on DSSD clients and servers, for example, as shown in dashed boxes 1410 and 1412.

1. host: DSSD provides APIs for various purposes: (a) object store operations, (b) Application Performance Monitoring (APM), (c) configuring DSSD cluster, (d) controlling DSSD operations at a physical server or cluster level, (e) obtaining statistical counters and performance information, or (f) direct file system operations (e.g., bypassing the operating system). Various applications implementing these APIs (e.g., host service clients) connect to a host server using a shared memory transport.
2. kdfs: A service that enables user applications to communicate with an optional kernel mode accelerator (kdfs) for file system operations. This uses a shared memory transport.
3. udfs: A service for an optional kernel mode accelerator to make Remote Procedure Calls (RPC) in the user space. This uses a shared memory transport.
4. divadmin: A service that maintains the global cluster configuration. All clients and servers work with divadmin server to ensure the cluster configuration they use remains current at all times. This uses an RPC transport.
5. divio: A service used by DSSD to parallelly initialize MOSs and to perform parallel writes to storage devices in the MSBDs of each MOS. This uses a direct transport.
6. dfsname: The name node service for file system and object store. This uses an RPC transport.
7. dfsdata: The data node service for file system and object store. This uses an RPC transport.
8. dfscache: A service used by the coherency manager in MOS to shoot down micro object names and data cached in clients. This uses an RPC transport.

The DSSD service has the ability to parallelize storage and network operations. As shown in FIG. 14, data migration service (DMS) 1414 is an application that can provide high throughput data transfer intercontinentally over the internet. The DMS application (a host service client) initiates a service via the dynamic object store (DOS) API to parallelly access of 256 files/objects at a time. The request gets processed in parallel by the host server, which invokes the dfsname and dfsdata services internally. The dfsname and/or dfsdata clients breaks down these operations to micro object level (e.g., 1 MB per micro object) and sends out all the requests in parallel. This may result in over 1000 RPC operations being dispatched (e.g., over Fabric or PCI Express) simultaneously to potentially hundreds of servers in the DSSD pool. This significantly improves the throughput of data transfer as well as greatly cutting down the latency of the overall operation. Applications such as APM 1416 shown in FIG. 14 may be instrumented with DSSD APM API, enabling detailed statistical information about storage and network operations that happened during the execution of the application to be timely collected and received. A DSSD command line interface (CLI) tool 1418 is instrumented with DSSD APIs to dynamically configure DSSD configurations and to control DSSD operations at a physical node or cluster level.

FIG. 16 illustrates performance of DSSD dynamic scaling. In FIG. 16, the quantitative benefits of DSSD dynamic scaling are shown with an example of constructing a DSSD cluster of a total size of 1 exabyte. The pre-provisioned scaling factor is 256. This is also the total number of physical servers when the cluster grows to full capacity. The key component of the illustration is the definition of MSBDs in 1602 indicating MSBD={p, q, r, s}*N*M. MSBD defines the streams p, q, r, and s corresponding to MOS configuration (raw HDD disk), core metadata (raw Flash disk), containerized metadata (macro disk with flash disks), and containerized data blocks (micro objects). The streams are described above with reference to FIG. 11. Also, of importance are two constants. N is the replication factor and M is the number of MOSs in a physical server. The cluster can be initiated at an extremely low cost with only 8 nodes, 2.5 PB of HDD (e.g., hot storage and MOS configuration), and 100 TB of Flash (e.g., SSD, metadata) in meiosis stage 0 of 1604. Over 4 meiosis stages, the cluster grows to full capacity with 256 nodes, 64.5 PB of HDD (hot storage and MOS configuration), 2 PB of Flash (SSD—metadata), 128 PB warm storage (e.g., AWS S3), and 1 EB of cold storage (e.g., AWS Glacier) at the last meiosis stage 1606. By the time the cluster grows to full capacity, the throughput would have increased by 32× of the throughput of the original cluster.

Figure 17:
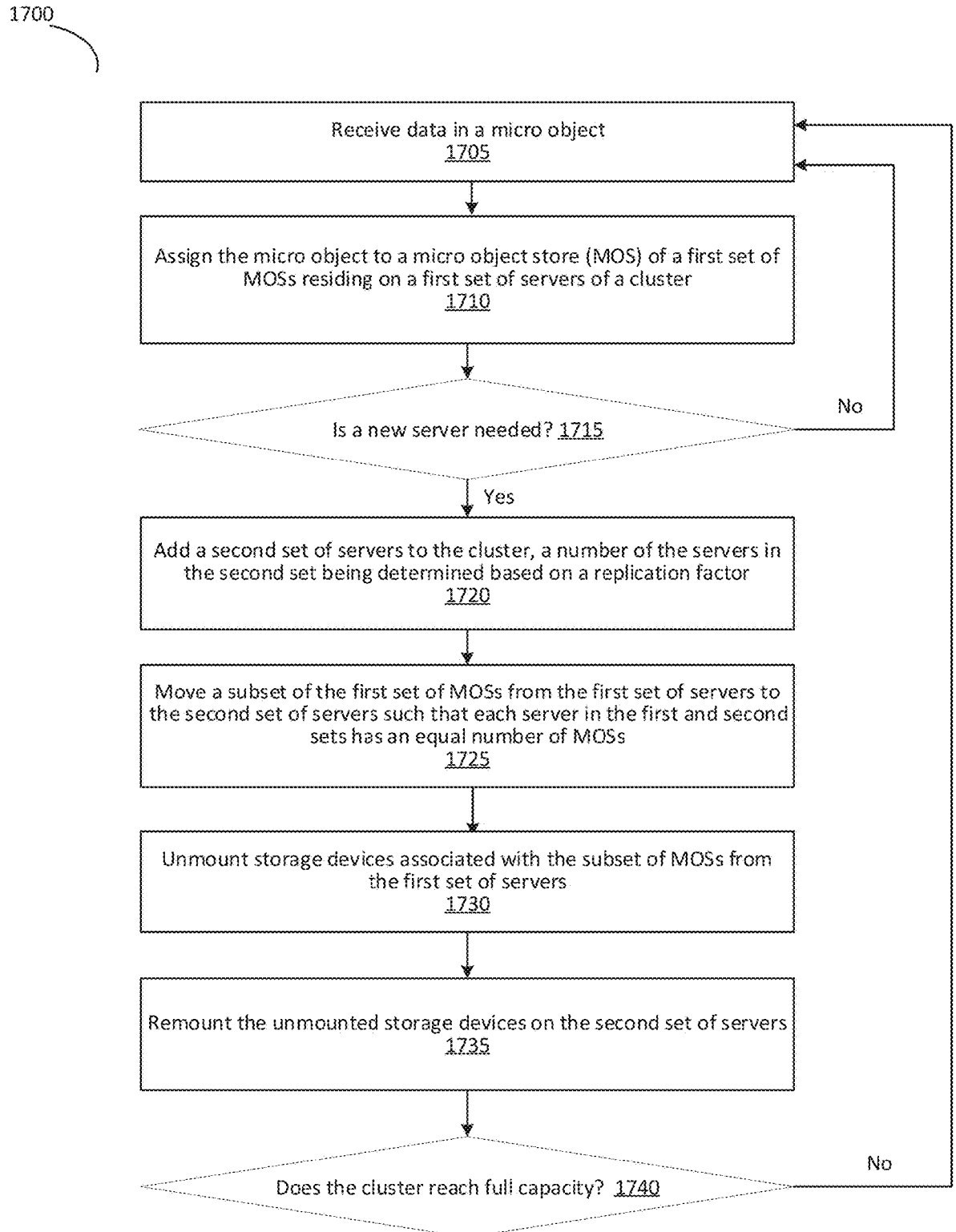
FIG. 17 illustrates an exemplary dynamic scaling process, according to some embodiments.

FIG. 17 illustrates an exemplary dynamic scaling process 1700, according to some embodiments. Advantageously, a DSSD can provide high storage scaling based on automatically parallelizing the access of name and data (e.g., creation, lookup, update) across multiple nodes or micro object stores. At step 1705, the DSSD receives data in a micro object. A file or an object can be fragmented into multiple finite-sized units, where each finite-sized unit is a micro object. The micro object is identified by a unique name. In some embodiments, the name is a combination of a name of the data object name and an offset of the micro object inside the data object. At step 1710, the DSSD assigns the micro object to a micro object store (MOS) of a first set of MOSs residing on a first set of servers of a cluster. In some embodiments, the MOS is a combination of name servers and data servers. The MOS is a partial file system. At step 1715, the DSSD determines whether a new server is needed based at least on resource usage of the first set of servers. For example, the DSSD determines whether the data distribution causes peak resource usage such as one or more of CPU, memory, and storage exceeding a predefined threshold. If a peak usage does not hit, there is no need for a new server and the method 1700 returns to step 1705 to continue receiving and storing data using the existing server(s). However, if the peak resources usage hits, the DSSD determines that a new server is needed, and the method 1700 starts a meiosis process to add one or more servers and migrate data to the new server(s).

At step 1720, the DSSD adds a second set of servers to the cluster, a number of servers in the second set being determined based on a replication factor. At 1725, the DSSD moves a subset of the first set of MOSs from the first set of servers to the second set of servers such that each server in the first and second sets has an equal number of MOSs. At 1730, the DSSD unmounts storage devices associated with the subset of MOSs from the first set of servers. At 1735, the DSSD remounts the unmounted storage devices on the second set of servers. The replication factor is a number requested by the DSSD. For example, if the replication factor is 2 and N micro object stores initially reside in one physical server (e.g., a first server). The meiosis may cause a new or second server to be added and N/2 micro object stores to move to the new server. Also, the storage devices are unmounted from the first server and remounted to the new second server. The meiosis involves zero data copies, and therefore achieves zero copy. The zero copy scaling reduces the processing time and also facilitates the DSSD to build partitions or buckets that scale to exabytes in size such that large pools of data can reside in one place.

Once a meiosis stage is complete, the data is received and evenly stored in the original and newly added servers. At step 1740, the DSSD determines whether the cluster reaches full capacity. If the full capacity of the cluster is not reached, another meiosis stage may start to add extra servers when a peak usage of the currently configured servers hits. Otherwise, the method 1700 ends.

Figure 18:
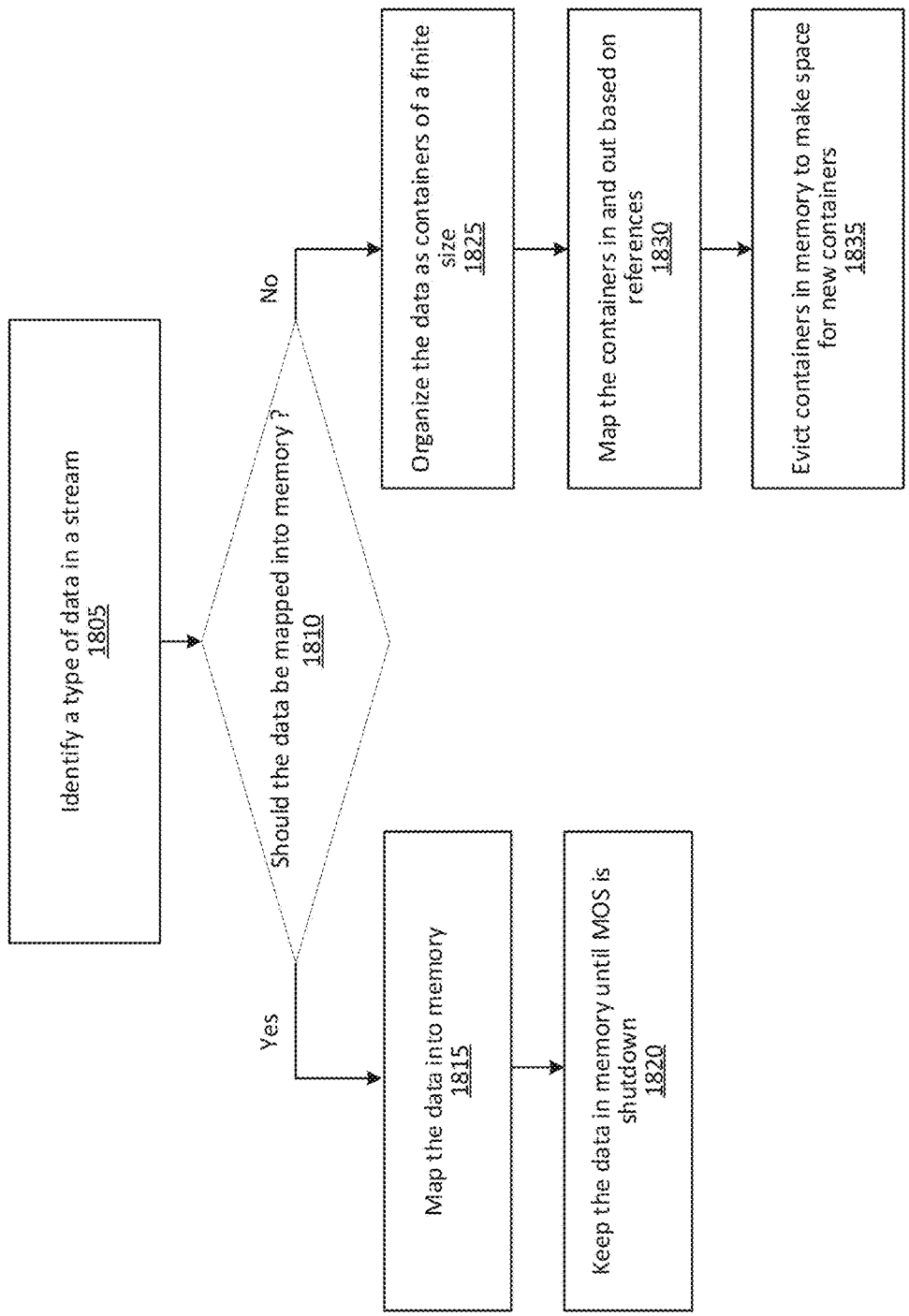
FIG. 18 illustrates an exemplary process for mapping data in memory, according to some embodiments.

FIG. 18 illustrates an exemplary process for mapping data in memory, according to some embodiments. As depicted, the DSSD maps different types of data to appropriate memory. At step 1805, the DSSD identifies a type of data in a stream, for example, stream 0 containing MOS configuration, stream 1 containing Metadata 1, stream 2 containing Metadata 2, and stream 3 containing data blocks as shown in FIGS. 11 and 12. At step 1810, the DSSD determines if the data should be directly mapped into memory. For example, small data such as MOS configuration and Metadata 1 may be maintained as a single file on their respective streams 0 and 1, and be mapped directly into memory during initialization of a MOS. At step 1815, the DSSD keeps the small data stay resident in memory until the MOS is shut down.

On the other hand, at step 1825, larger data such as Metadata 2 and data blocks respectively in streams 2 and 3 are organized as containers of a finite size (e.g., 4 MB). At step 1830, the DSSD maps the containers in and out based on their references. At step 1835, the DSSD may use a set of policies, e.g., Least Recently Used (LRU), to evict containers in memory to make space for new containers. Usually, the DSSD uses containers to effectively organize data of various sizes. One container may contain only data of a particular size. This helps reduce fragmentation and speed up reuse of the space, when data is rapidly deleted and recreated.

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other units suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system comprising:
a first set of micro object stores (MOSs) operating on data in a data domain, the data being stored in storage devices of a storage domain;
one or more clients that request data reference operations via a first connectivity domain with the first set of MOSs; and
a plurality of multi stream block devices (MSBDs) in two or more storage domains, wherein the storage domains are logically grouped into the MSBDs and each MOS in the first set is associated with a set of MSBDs of the plurality of MSBDs, wherein the storage domains are communicatively coupled to the data domain through a second connectivity domain, wherein the dynamic storage scaling system is configured to:
receive the data in a micro object from a client;
assign the micro object to a MOS of the first set of MOSs residing on a first set of servers of a cluster;
determine that a new server is needed based at least on resource usage of the first set of servers;
add a second set of servers to the cluster, a number of the servers in the second set being determined based on a replication factor;
move a subset of the first set of MOSs from the first set of servers to the second set of servers such that each server in the first and second sets has an equal number of MOSs;
unmount storage devices of the MSBDs associated with the subset of MOSs from the first set of servers; and
remount the unmounted storage devices on the second set of servers.

2. The dynamic storage scaling system of claim 1, wherein the system is further configured to transfer the MSBDs associated with the subset of MOSs from the first set of servers to the second set of servers.

3. The dynamic storage scaling system of claim 1, wherein an MSBD is a logic storage unit that includes replicated data, and a number of the MSBDs associated with each MOS is equal to the replication factor.

4. The dynamic storage scaling system of claim 1, wherein the storage devices are grouped into at least one of hot storage, warm storage, or cold storage that are accessed via a third connectivity domain.

5. The dynamic storage scaling system of claim 1, wherein the storage devices associated with the MSBDs are fully relocatable in a way that no data is copied when the second set of servers are added to the cluster.

6. The dynamic storage scaling system of claim 1, wherein the system is further configured to allocate the MSBDs associated with the MOS on separate storage domains for fault tolerance.

7. A method, comprising:
receiving data in a micro object;
assigning the micro object to a micro object store (MOS) of a first set of MOSs residing on a first set of servers of a cluster;
determining that a new server is needed based at least on resource usage of the first set of servers;
adding a second set of servers to the cluster, a number of the servers in the second set being determined based on a replication factor;
moving a subset of the first set of MOSs from the first set of servers to the second set of servers such that each server in the first and second sets has an equal number of MOSs;
unmounting storage devices associated with the subset of MOSs from the first set of servers; and
remounting the unmounted storage devices on the second set of servers.

8. The method of claim 7, wherein each MOS in the first set is associated with a set of multi stream block devices (MSBDs), and an MSBD is a logic storage unit that includes replicated data.

9. The method of claim 8, further comprising transferring the MSBDs corresponding to the subset of MOSs from the first set of servers to the second set of servers, wherein the storage devices that are unmounted from the first set of servers and remounted to the second set of servers are storage devices corresponding to the transferred MSBDs.

10. The method of claim 8, wherein the storage devices associated with the MSBD are fully relocatable in a way that no data is copied when the second set of servers are added to the cluster.

11. The method of claim 8, wherein the MSBDs facilitate different types of data to be channeled over an arbitrary number of different streams.

12. The method of claim 11, further comprising mapping the streams of MSBDs onto memory and maintaining the streams coherently in association with a coherency manager of the MOS.

13. The method of claim 7, further comprising
fragmenting a data object into multiple finite-sized units, wherein the micro object is a finite-sized unit of data; and
identifying the micro object by a unique name, wherein the name is a combination of a name of the data object and an offset of the micro object inside the data object.

14. The method of claim 7, wherein the MOS is a combination of name servers and data servers and is used as a partial file system.

15. The method of claim 14, further comprising synchronously updating attributes of objects during a storage operation while parallelly distributing name and object fragments of the micro objects across the MOS, wherein the attributes include at least one of a size, a permission, a unique name, a time of creation, a time of access, or a time of modification.

16. The method of claim 7, further comprising partitioning the data into one of hot storage, warm storage, and cold storages.

17. The method of claim 7, further comprising using a distribution function to determine a placement of a name and data of the micro object in the MOS.

18. The method of claim 7, wherein each MOS or groups of MOSs occupy a power domain.

19. The method of claim 7, further comprising locking the data in a memory cache and synchronizing the data in the memory cache according to different policies.

20. The method of claim 7, further comprising:
logically organizing a raw disk as micro disks, a micro disk being a string of storage units of a finite size; and
maintaining a micro disk map for dynamically quarantining and replacing micro disks when a storage error is encountered.

* * * * *